US012649296B2

(12) United States Patent
Boegli et al.

(10) Patent No.: US 12,649,296 B2
(45) Date of Patent: Jun. 9, 2026

(54) ENGRAVED MODULATED PIECE

(71) Applicant: BOEGLI-GRAVURES SA, Marin-Epagnier (CH)

(72) Inventors: Charles Boegli, Marin-Epagnier (CH); Alain Droz, Thielle (CH); Gabriel Dumitru, Nussbaumen (CH); Felix Lustenberger, Marin-Epagnier (CH)

(73) Assignee: BOEGLI-GRAVURES SA, Marin-Epagnier (CH)

( * ) Notice: Subject to any disclaimer, the term of this patent is extended or adjusted under 35 U.S.C. 154(b) by 465 days.

(21) Appl. No.: 18/012,874

(22) PCT Filed: Jun. 23, 2021

(86) PCT No.: PCT/IB2021/055543
§ 371 (c)(1),
(2) Date: Dec. 23, 2022

(87) PCT Pub. No.: WO2021/260574
PCT Pub. Date: Dec. 30, 2021

(65) Prior Publication Data

US 2023/0249430 A1 Aug. 10, 2023

(30) Foreign Application Priority Data

Jun. 24, 2020 (EP) .................................... 20182078

(51) Int. Cl.
*B31F 1/07* (2006.01)
*G07D 7/005* (2016.01)

(52) U.S. Cl.
CPC ............... *B31F 1/07* (2013.01); *G07D 7/005* (2017.05); *B31F 2201/072* (2013.01); *B31F 2201/0733* (2013.01); *B31F 2201/0738* (2013.01)

(58) Field of Classification Search
CPC .................. B31F 1/07; B31F 2201/072; B31F 2201/0733; B31F 2201/0738; G07D 7/005; G07D 7/181
See application file for complete search history.

(56) References Cited

U.S. PATENT DOCUMENTS 5,007,271 A 4/1991 Boegli
5,598,774 A 2/1997 Boegli
(Continued)

FOREIGN PATENT DOCUMENTS

AU 772613 B2 11/2000
CA 2367423 C 9/2000
(Continued)

OTHER PUBLICATIONS

European Search Report dated Dec. 2, 2020, issued in European Application No. 20182078.4, 4 pages.
(Continued)

*Primary Examiner* — Sonji N Johnson
(74) *Attorney, Agent, or Firm* — Nixon & Vanderhye, PC

(57) ABSTRACT

An engraved solid piece carries data comprising specific information on a surface of the engraved solid piece. The surface is covered by a plurality of block structures, comprising at least a first block structure. Each block structure is a spatially restricted collection of modulated features and base features, which are spread over the surface of the engraved solid piece. Each modulated feature and each base feature has respectively a three-dimensional modulated-feature profile and a three-dimensional base-feature profile. Each of the modulated-feature profiles is the result of applying a corresponding modulation to one of the three-dimensional base-feature profiles, according to a specific, corresponding information. Each modulated feature further
(Continued)

is a symbol, which is a transcription of a character of an alphabet. The alphabet is a collection of characters, which are distinct objects of well-defined elementary data. Each of the base features is an engraved elementary three-dimensional topographical element of the surface. Each of the modulated features is an engraved three-dimensional topographical element of the surface. At least a part of the data is transcribed by a code-block structure of modulated features, the code-block structure thereby constituting at least a part of a block structure corresponding to the at least one part of the data. The modulated features of the first block structure are arranged according to a first ordered map, the first ordered map comprising at least a first finite ordered set of first positions of the modulated features of a first code-block structure on the surface, the first block structure corresponding to a first part of the data, and the first ordered map further is configured to arrange the modulated features of the first block structure to constitute an aesthetic ensemble on the surface and render the respective symbols corresponding to the modulated features of the first code-block structure imperceptible to the human eye, but retrievable by means of a software-driven image-sensor/processor combination.

12 Claims, 33 Drawing Sheets

(56) References Cited

U.S. PATENT DOCUMENTS

| | | | |
|---|---|---|---|
| 6,176,819 | B1 | 1/2001 | Boegli et al. |
| 6,665,998 | B1 | 12/2003 | Boegli |
| 6,715,411 | B1 | 4/2004 | Boegli |
| 7,036,347 | B2 | 5/2006 | Boegli |
| 7,147,453 | B2 | 12/2006 | Boegli |
| 7,229,681 | B2 | 6/2007 | Boegli |
| 8,038,922 | B2 | 10/2011 | Boegli |
| 8,430,663 | B2 | 4/2013 | Boegli |
| 8,495,900 | B2 | 7/2013 | Boegli |
| 8,932,044 | B2 | 1/2015 | Boegli |
| 9,140,834 | B2 | 9/2015 | Boegli |
| 9,156,107 | B2 | 10/2015 | Boegli et al. |
| 9,180,643 | B2 | 11/2015 | Boegli |
| 9,481,141 | B2 | 11/2016 | Boegli |
| 9,505,167 | B2 | 11/2016 | Boegli |
| 9,579,924 | B2 | 2/2017 | Boegli |
| 9,636,885 | B2 | 5/2017 | Boegli et al. |
| 9,809,927 | B2 | 11/2017 | Boegli |
| 9,939,725 | B2 | 4/2018 | Boegli et al. |
| 9,990,686 | B2 * | 6/2018 | Chen .................... G09G 3/2051 |
| 9,993,895 | B2 | 6/2018 | Boegli et al. |
| 10,083,253 | B2 | 9/2018 | Boegli et al. |
| 10,183,318 | B2 | 1/2019 | Boegli et al. |
| 2004/0151796 | A1 | 8/2004 | Boegli |
| 2005/0015370 | A1 | 1/2005 | Stavely et al. |
| 2005/0279147 | A1 | 12/2005 | Boegli |
| 2005/0280182 | A1 | 12/2005 | Boegli |
| 2010/0061619 | A1 | 3/2010 | Boegli |
| 2011/0223381 | A1 | 9/2011 | Sauter et al. |
| 2012/0018993 | A1 | 1/2012 | Boegli et al. |
| 2012/0292821 | A1 | 11/2012 | Boegli |
| 2014/0059977 | A1 | 3/2014 | Boegli |
| 2016/0075077 | A1 | 3/2016 | Boegli et al. |
| 2017/0066079 | A1 | 3/2017 | Reisse et al. |
| 2017/0109857 | A1 | 4/2017 | Chen et al. |
| 2017/0282635 | A1 | 10/2017 | Boegli et al. |
| 2018/0220698 | A1 | 8/2018 | Boegli et al. |
| 2018/0370175 | A1 | 12/2018 | Boegli et al. |
| 2020/0086600 | A1 | 3/2020 | Boegli et al. |
| 2020/0324505 | A1 | 10/2020 | Boegli et al. |
| 2021/0129478 | A1 | 5/2021 | Boegli et al. |
| 2021/0154964 | A1 | 5/2021 | Boegli et al. |
| 2021/0237199 | A1 | 8/2021 | Boegli et al. |
| 2021/0260633 | A1 | 8/2021 | Boegli et al. |
| 2021/0276298 | A1 | 9/2021 | Boegli et al. |
| 2022/0347962 | A1 | 11/2022 | Boegli et al. |

FOREIGN PATENT DOCUMENTS

| | | | |
|---|---|---|---|
| CA | 2382597 | A1 | 11/2000 |
| DE | 202017105458 | U1 | 12/2017 |
| EP | 2327502 | A1 | 6/2011 |
| EP | 2327503 | A1 | 6/2011 |
| EP | 2572820 | A1 | 3/2013 |
| EP | 2653301 | A1 | 10/2013 |
| EP | 3300612 | A1 | 4/2018 |
| EP | 3415306 | A1 | 12/2018 |
| EP | 3437849 | A1 | 2/2019 |
| WO | 2007/012215 | A1 | 2/2007 |
| WO | 2016/077934 | | 5/2016 |
| WO | 2020/002970 | | 1/2020 |

OTHER PUBLICATIONS

Written Opinion dated Dec. 2, 2020, issued in European Application No. 20182078.4, 9 pages.

International Search Report for PCT/IB2021/055543 dated Oct. 20, 2021, 6 pages.

Written Opinion of the ISA for PCT/IB2021/055543 dated Oct. 20, 2021, 13 pages.

* cited by examiner

1800

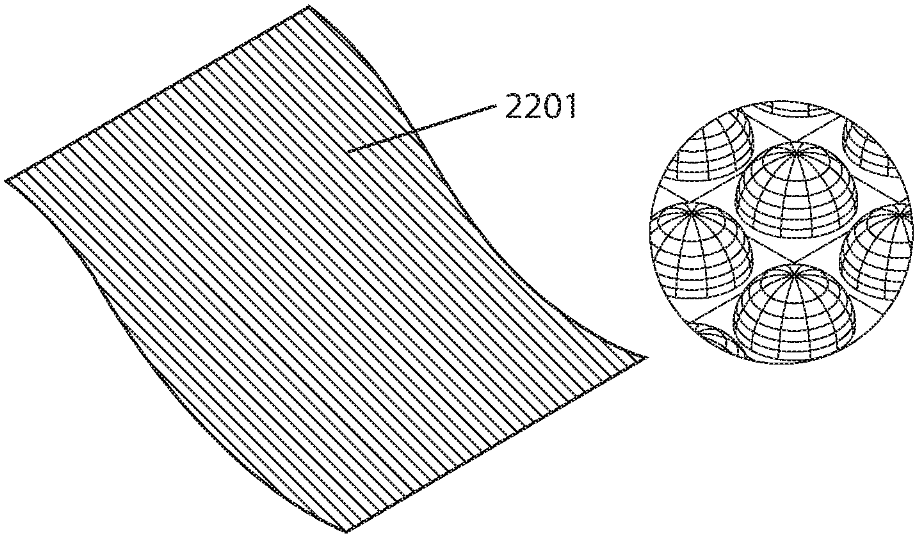
22A
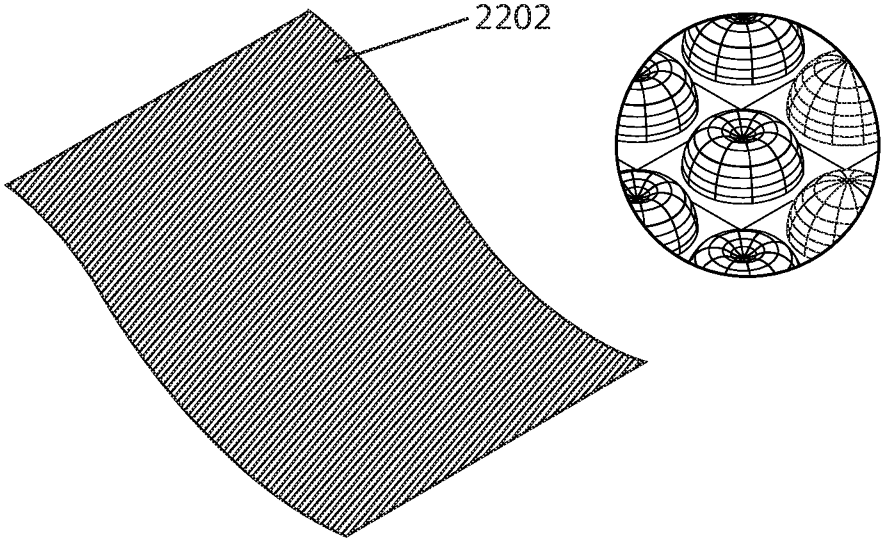
22B
FIG. 22A/B

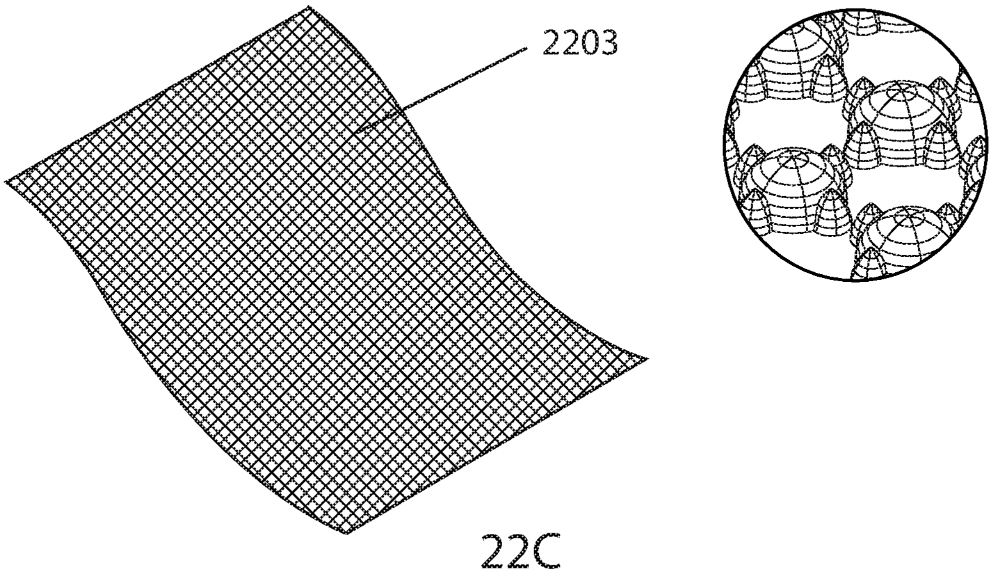
22C
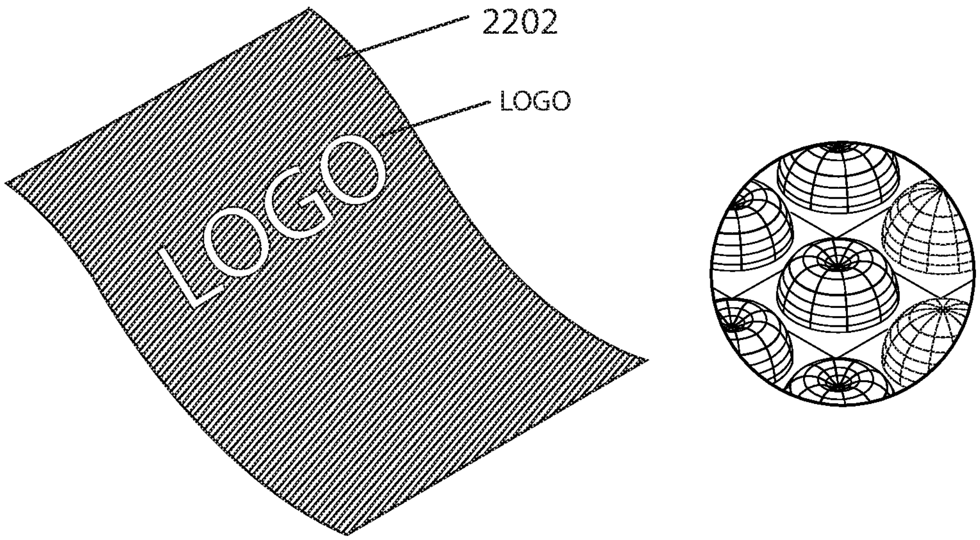
22D
FIG. 22C/D

3200

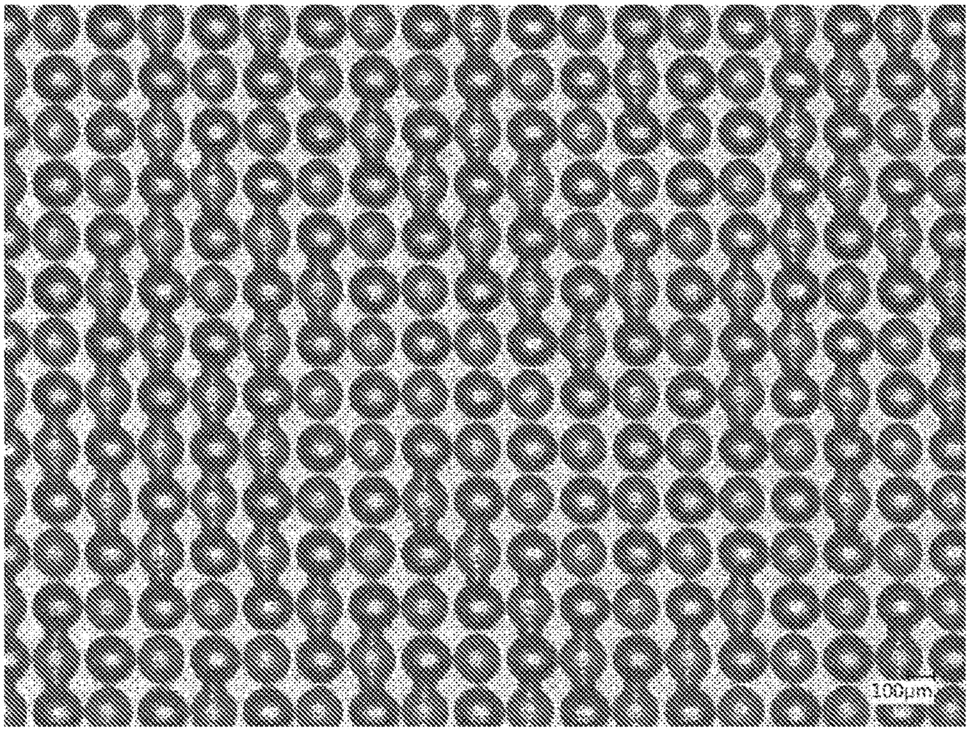
36A
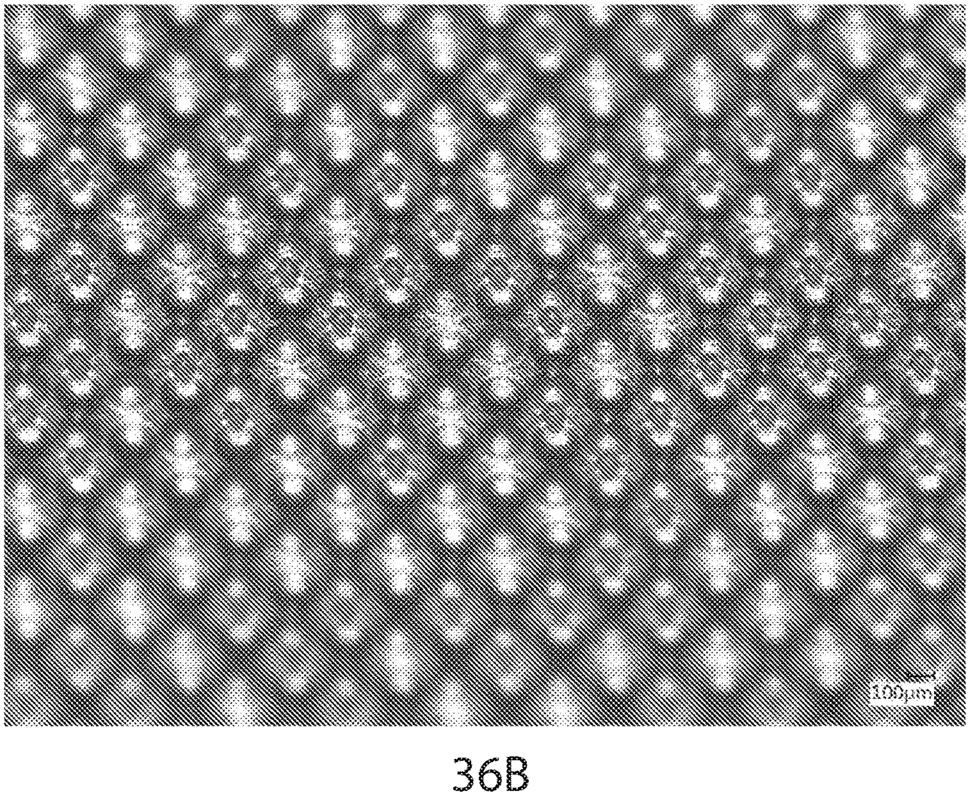
36B
FIG. 36A/B

ENGRAVED MODULATED PIECE

CROSS-REFERENCE TO RELATED APPLICATIONS

This application is the U.S. national phase of International Application No. PCT/IB2021/055543 filed Jun. 23, 2021 which designated the U.S. and claims priority to EP Patent Application No. 20182078.4 filed Jun. 24, 2020, the entire contents of each of which are hereby incorporated by reference.

FIELD OF THE INVENTION

The invention relates to an engraved solid piece for carrying data comprising specific information on a surface of the engraved solid piece. The invention further relates to a method for manufacturing such an engraved solid piece, and to a method for configuring a plurality of block structures of modulated features and/or base features intended to be engraved on the surface of the solid piece.

BACKGROUND ART

European publication EP3437849 to the present applicant discloses an embossing tool for embossing a combined embossing pattern into a packaging material, the combined embossing pattern including decoratively embossed structures and at least one embossed code. The embossing tool includes a patrix and a matrix embossing device for cooperating with each other, embossing structures of the patrix and matrix embossing device formed to produce the combined embossing pattern into the packaging material in an embossing gap. The embossing structures of the patrix and the matrix embossing device further include first embossing structures intended for making the at least one embossed code, which are inverse congruent patrix and matrix embossing structures having a polyhedral shape. The decoratively embossed structures and the at least one embossed code produced by the embossing structures are arranged such that the at least one embossed code has a reduced visibility to the human eye. In order to achieve this, embossing structures intended for making the decorative embossed structures are adjacent to code areas comprising embossing structures for making the embossed code. Decorative areas may alternate successively with code areas. Different codes may also be overlaid by each other by using different structures to emboss the codes. For example, in case an embossed cell of a first code lies at the same location as an embossed cell of a second code, the cells can be embossed as full square cells, and in case only an embossed cell of the second code is present, the cell can be embossed with an empty square. Moreover, in case only an embossed cell of the first code is present, the cell can be embossed with a full circle. Hence, it is possible to recover two overlaid codes by identifying over a delimited surface all embossed cells belonging to the first code on one hand, and all embossed cells that belong to the second code on the other hand, even when such embossed cells are used for representing the first code and the second code at the same time. In a similar manner, it is possible to overlap a surface area of an embossed code with a surface area of the decorative pattern. Shapes of embossed cells allow determining whether an embossed cell is used to define the embossed code, the decorative pattern, or both. It is only the distribution of the embossed cells that belong to the embossed code, i.e., the distribution thereof over a surface of the embossed material, allows recovering the embossed code.

International publication WO2020/002970 to the present applicant discloses an embossing method allowing modulating individual features and arranging them in a grid, whereby the modulated individual features enable to obtain surface-oriented visible optical effects with an aesthetic purpose. In this manner, the method described allows creating brilliant and high-quality results in foil material. This publication makes no mention of encoding and/or hiding information by any means, and more particularly by means of the modulated individual features. Furthermore, it does not require any particular technical means to reveal the aimed visible optical effects in light reflected from a foil material embossed according to the method of WO2020/002970.

The present invention aims to propose an alternative for carrying data comprising specific information on a surface of an engraved solid piece, in which the carried data is intermingled with an aesthetic ensemble on the surface but rendered imperceptible to the human eye.

SUMMARY OF INVENTION

In a first aspect, the invention provides an engraved solid piece carrying data comprising specific information on a surface of the engraved solid piece. The surface is covered by a plurality of block structures, comprising at least a first block structure. Each block structure is a spatially restricted collection of modulated features and base features, which are spread over the surface of the engraved solid piece. Each modulated feature and each base feature has respectively a three-dimensional modulated-feature profile and a three-dimensional base-feature profile. Each of the modulated-feature profiles is the result of applying a corresponding modulation to one of the three-dimensional base-feature profiles, according to a specific corresponding information. Each modulated feature further is a symbol, which is a transcription of a character of an alphabet. The alphabet is a collection of characters, which are distinct objects of well-defined elementary data. Each of the base features is an engraved elementary three-dimensional topographical element of the surface. Each of the modulated features is an engraved three-dimensional topographical element of the surface. At least a part of the data is transcribed by a code-block structure of modulated features, the code-block structure thereby constituting at least a part of a block structure corresponding to the at least one part of the data. The modulated features of the first block structure are arranged according to a first ordered map, the first ordered map comprising at least a first finite ordered set of first positions of the modulated features of a first code-block structure on the surface, the first block structure corresponding to a first part of the data, and the first ordered map further is configured to arrange the modulated features of the first block structure to constitute an aesthetic ensemble on the surface and render the respective symbols corresponding to the modulated features of the first code-block structure imperceptible to the human eye, but retrievable by means of a software-driven image-sensor/processor combination.

In a preferred embodiment, the engraved solid piece further comprises on its surface an at least one second block structure being a second spatially restricted collection of exclusively a plurality of at least one of the base features. The base features of the at least one second block structure are arranged on the solid surface according to a second map, the second map being a second finite set of positions of the base features on the surface, the second map further enabling its base features to be arranged to constitute an aesthetic ensemble on the surface.

In a further preferred embodiment the engraved solid piece:

has a cylindrical symmetry, and is configured as a tool for a transfer of the modulated features and/or the base features into a substrate, the transfer being any one of the following:

shaping, printing, molding, crafting, pressing, and embossing onto or into the substrate, of the modulated features and/or the base features.

In a further preferred embodiment, the engraved solid piece is configured to be used as a forming tool, for a transfer of the modulated features and/or the base features into a substrate, the transfer being any one of the following:

printing, molding, crafting, pressing, and embossing onto the substrate, of the engraved modulated features and/or the engraved base features.

in a further preferred embodiment, the engraved solid piece further comprises a plurality of first ordered maps and second maps, wherein the plurality of first ordered maps and second maps are arranged along at least a regular grid.

In a further preferred embodiment, the engraved solid piece further comprises a plurality of first ordered maps and second maps, wherein the plurality of first ordered maps and second maps are arranged along at least a randomized grid.

In a further preferred embodiment, the engraved solid piece further comprises a plurality of first ordered maps and second maps, wherein the plurality of first maps and second maps are configured to carry first parts of data and constitute at least one aesthetic ensemble; and arranged such that the positions of the modulated features of the carried first parts of data is imperceptible to the human eye, but retrievable only by means of a software-driven image-sensor/processor combination.

In a further preferred embodiment, the engraved solid piece further comprises at least a further first ordered map, the further first ordered map being a further finite set of further positions of the modulated features on the surface, each further position being a result of a determined translation of a corresponding first position of the first ordered map, the further first ordered map being configured to define a further first block structure that is non-overlapping with the first block structure defined by the first ordered map, and either adjacent to the first block structure;

separated from the first block structure by a determined distance; or in case there are a plurality of further first ordered maps, separated from each other in a regular manner in 2 dimensions.

In a further preferred embodiment, the engraved solid piece further carries a third part of data on the surface corresponding to a third map. The third map is a third finite set of positions of the modulated features on the surface, the third map being configured to define a third block structure that is non-overlapping with the first block structure defined by the first map, and any one of the following adjacent to the first block structure;

separated from the first block structure by a determined distance; or in case there are a plurality of third maps, separated from each other and from the first block structure.

In a second aspect, the invention provides a method for manufacturing an engraved solid piece configured for carrying data comprising specific information, on a surface of the engraved solid piece. The method comprises engraving (S1) on the surface a plurality of block structures (BS), comprising at least a first block structure, whereby each block structure is a spatially-restricted collection of modulated features and base features, which are spread over the surface of the engraved solid piece, each modulated feature and each base feature having respectively a three-dimensional modulated-feature profile and a three-dimensional base-feature profile, each of the modulated-feature profiles being the result of applying a corresponding modulation to one of the three-dimensional base-feature profiles, according to a specific corresponding information, each modulated feature further being a symbol, which is a transcription of a character of an alphabet, the alphabet being a set of characters, which are distinct objects of a well-defined elementary data, each of the base features being an engraved elementary three-dimensional topographical element of the surface, each of the modulated features being an engraved three-dimensional topographical element of the surface, at least a part of the data being transcribed by a code-block structure of modulated features, the code-block structure thereby constituting at least a part of a block structure corresponding to the at least one part of the data, whereby the modulated features of the first block structure are arranged according to a first ordered map, the first ordered map comprising at least a first finite ordered set of first positions of the modulated features of a first code-block structure on the surface, the first block structure corresponding to a first part of the data, and whereby the first ordered map further is configured to arrange the modulated features of the first block structure to constitute an aesthetic ensemble on the surface and render the respective symbols corresponding to the modulated features of the first code-block structure imperceptible to the human eye, but retrievable by means of a software-driven image-sensor/processor combination.

In a further preferred embodiment, the step of engraving on the surface a plurality of block structures is executed by any one of the following:

(precision) milling, laser ablation, chemical engraving, plasma etching, and stamping.

In a third aspect, the invention provides a method for configuring a plurality of block structures of modulated features and base features intended to be engraved on a surface of a solid piece, whereby each modulated feature and each base feature has respectively a three-dimensional modulated-feature profile and a three-dimensional base-feature profile, which enables to engrave each of the modulated features and each of the base features, each block structure comprises a corresponding code-block structure of transcribed data, and each block structure is a collection of modulated features and base features, configured to be spread over a spatially restricted part of the surface.

The method comprises:

creating each of the modulated features profiles by applying a corresponding modulation by means of a modulator feature profile to one of the base features profiles, according to a symbol, which is a transcription of a character of an alphabet, the alphabet being a collection of characters, which are distinct objects of well-defined elementary data, transcribing at least a first part of the data for a first code-block structure by means of the modulated-feature profiles, arranging the modulated features corresponding to the first code-block structure in at least a first block structure of the plurality of block structures, according to a first ordered map, the first ordered map being a first finite set of positions of the modulated features of the first code-block structure, and configuring the modulated features in the first ordered map to constitute an aesthetic ensemble on the surface and render the respective symbols corresponding to the modulated features of the first code-block structure imperceptible to the human eye for the intended engraving, but retrievable only by means of a software-driven image-sensor/processor combination.

In a fourth aspect, the invention provides a method for authenticating a surface-structured product, by means of linked information associated to an identifier which is associated with the surface-structured product, the identifier being embedded into a code-block structure of a block structure of a surface of the product. The method comprises the steps of:

capturing an image from the block structure of the product with a camera that is associated with a first data-processing device;

analyzing the captured image at the first data-processing device to extract the identifier by a first algorithm;

transmitting the identifier to a second data-processing device;

querying a database with the second data-processing device to access the linked information stored in the database, the linked information being associated with the identifier; and sending the linked information to the first data-processing device.

In a further preferred embodiment, the method for authenticating the product further comprises the steps of:

after the step of querying, verifying if the linked information indicates that the surface-structured product is prone to counterfeiting, and requesting by the second data-processing device data of the image from the first data-processing device; and analyzing the captured image at the second data-processing device to extract additional information from the code-block structure with a second algorithm of forensic examination of the code-block structure, that is different from the first algorithm.

In a further preferred embodiment, the method for authenticating the product wherein:

the verifying is executed at at least one of the first and second data-processing device, the requesting by the second data-processing device is for a capturing of another image by the camera of the first data-processing device, the another image having an improved image quality as compared to the captured image, and the analyzing is performed on the another image.

In a further preferred embodiment, the step of analyzing further comprises:

filtering the image for removing at least one of artifacts, noise, geometric distortion, and illumination non-uniformity for obtaining a filtered image;

performing grid extraction to the filtered image, whereby a grid is overlayed over the filtered image to serve as a reference coordinate system;

detecting a synchronization pattern by using information aligned to the grid;

detecting at least one symbol based on a position of the synchronization pattern; and decoding the identifier from the at least one symbol based on a mapping function.

In a further preferred embodiment, the method for authenticating the product further comprises extracting an authentication information associated with the captured image, the authentication information being unique to the captured image; and sending the authentication information to the second data-processing device.

One particular advantage of the invention is that it enables a comparatively higher density of information for carrying data, compared for example to the prior art EP3437849 discussed herein above.

BRIEF DESCRIPTION OF THE DRAWINGS

The invention will be understood better through the description of embodiments, and in reference to the drawings, in which FIG. 1 contains graphics used to illustrate the definition of coordinate systems;

FIGS. 22A-D show four (4) realization examples of embossed foil products;

FIGS. 36A/B exhibit two microscopic images of a tool surface as a practical example of having base features and modulated features alongside each other.

Figure 1:
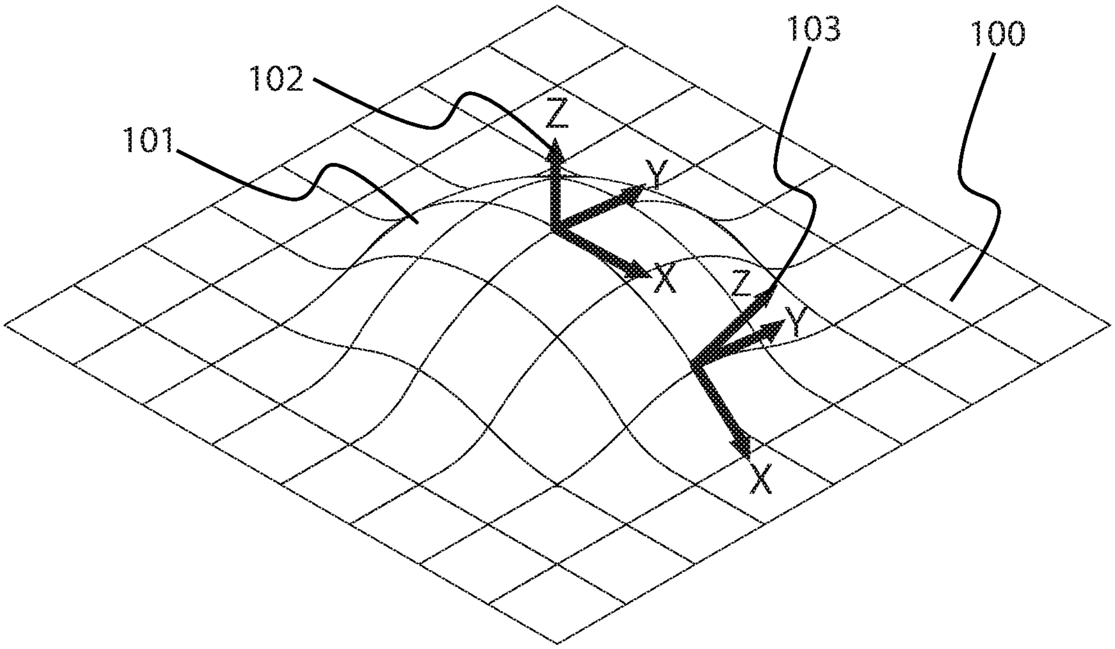

Same references will be used to designate same or similar features throughout all of the figures.

DESCRIPTION OF EMBODIMENTS OF THE INVENTION

Glossary

With Regard to the Substrate

- a feature profile: a description of a three-dimensional topographical profile meant to be engraved into a surface of a solid piece or to be transferred onto a substrate; the feature profile may be described by a determined function z=f(x,y) and has a limited size, typically smaller than 0.5 mm in all three dimensions;
- a base feature: an engraved elementary three-dimensional topographical element engraved into the surface of the solid piece. The base feature has a base feature profile;
- a modulated feature: an engraved three-dimensional topographical element, whose three-dimensional modulated-feature profile is the result of applying a feature profile by means of an operator, i.e., a modulator, to a base feature profile;
- a map: a finite set of positions on the surface of the solid piece or the substrate, determining locations of base features and modulated features;
- a block structure: a spatially restricted collection of base features and/or modulated features, which are spread over the surface of the solid piece or the substrate according to an ordered map;
- a decoration: a block structure that is precisely employed to carry a visual impression or a haptic response.

With Regard to Transfer

- transfer: any one of, for example, shaping, printing, molding, crafting, pressing, and embossing onto a substrate, of at least a three-dimensional topographical element formed on a solid piece;
- a tool: a material part having base features and/or modulated features on at least one surface, the material being for example metal, ceramics, in bulk or layer form, and meant to transfer its surface structure onto another material;
- a roller: a tool characterized by a cylindrical symmetry, and dimensions of, for example, a length <5 m, and a diameter <1 m, profiled with base features and/or modulated features on its lateral surface;
- patrix/matrix rollers: a set of synchronized profiled rollers, having inversely-congruent base features and/or modulated features on their respective lateral surfaces;
- embossing: the process of transferring the features from at least one roller or from a tool onto a fluid or solid substrate or onto another solid piece.

With Regard to Encoding

- a code-block structure: a block structure with modulated features, which is precisely employed to represent data comprising specific information;
- a character: a distinct object of an alphabet;
- an alphabet: a well-defined set of distinct characters, e.g., distinct elementary data;
- a modulation: a specific operation transcribing a character into a corresponding three-dimensional feature profile meant to be engraved;
- a symbol: a three-dimensional feature profile that is the outcome of a modulation;
- a symbol array: an N×M array of symbols, where N and M are integers.

Detailed Description of Preferred Embodiments of the Invention

The patent publications described in the above Background Art section disclose the use of a pattern of features for the purpose of satinizing a foil or a paper, and therewith achieving an aesthetic, decorative effect. The pattern may be a regular embossing pattern that is applied to a surface of a solid piece in the intention of embossing the features of the pattern in the foil or paper by means of the solid piece.

For the sake of convenience, in the following we will refer to a foil product when designating metal foil, polymer foil, paper, laminated paper or hybrids, cardboard, or other thin-sheet product to be embossed with thicknesses <900 μm.

More generally, in the field of embossing, and for the present invention, we refer to the map as a finite set of positions on the surface of the solid piece or the substrate, determining locations of base features and modulated features, i.e., three-dimensional structures, on the surface of the solid piece or substrate. The map may be a basis for placing the features as a block structure onto the surface of the solid piece or substrate.

A manufacture of such features on the surface of the solid piece may involve various tools and engraving methods, such as for example laser engraving, laser ablation, chemical engraving, plasma etching, stamping, milling, etc.

The solid piece may for example be embodied by a tool such as a set of a first rotating roller and a second rotating roller, where the first roller comprises one or more features as cavities in the surface of the first roller and the second roller comprises corresponding inverted congruent features as protrusion on the surface of the second roller. In such a case, the first roller may be designated as a matrix roller and the second roller as a patrix roller. Hence, when a foil product is fed in a nip between the first roller and the second roller for embossing, each cavity-shaped feature becomes penetrated by the corresponding protruding and congruent feature of the second roller, thereby modifying the structure of the foil product by modification of a normal vector of the foil product's surface.

Another embodiment of the solid piece may be an injection mold.

In an even further non-limiting embodiment, the features may be engraved directly into a customer product rather than being manufactured on a tool.

We refer herein to a surface-structured product as being a customer-oriented product, as opposed to a tool used to fabricate a surface-structured product that bears the described block structure of features.

We further define with respect to a surface bearing one or more of the base and/or modulated features, coordinate systems where the axis z is aligned to the normal of the surface of the substrate, the axis x is tangent to the surface and the axis y is the result of the cross product between x and z, such that an orthogonal space is formed. Referring to FIG. 1, this illustrates the coordinate systems. Schematically, a base surface 100 surrounds a feature 101, which is manifested by a modification of a structure of the base surface 100. Two examples of normal vectors of the feature's 101 surface and corresponding axis z 102 and axis z 103 are illustrated: the axis z 102 being for a top position and the axis z 103 being for a lateral side position on the feature 101, respectively.

Considerations about the Map

In a known configuration, multiple features may be aligned in a checkerboard fashion on the surface of a tool or surface-structured product, i.e., aligned alongside a two-dimensional grid, such that the multiple features compose a largely uniform area on the surface. In other words, the multiple features cover the concerned area in a constant regular manner. The set of multiple features thus aligned correspond to positions comprised in a map. More specifically, the map is defined as a finite set of positions on the surface of the solid piece of the substrate, e.g., a set of positions (x, y) where x and y are defined in the uniform two-dimensional grid, hence determining locations of features. The positions may correspond for example to the location of a geometrical center of the respective features' footprint on the surface.

In an example embodiment of the invention described herein, the features may have either one of positive polarity and negative polarity, and be called respectively positive feature and negative feature. By positive polarity is meant that an average z-component of the positive feature is greater than the z=0 of that feature, and by the negative polarity is meant that the average z component of the negative feature is smaller than the z=0 of that feature. The z=0 of any one of the features is typically defined as the z position where the (x,y)-section formed by intersecting a horizontal plane with respect to z-direction with the feature is of the largest surface. Another way of defining z=0 is that it corresponds to a base surface of the solid piece.

The map may comprise positions of positive and negative features that alternate in sequence and are arranged in a checkerboard fashion. This means that each positive feature is surrounded by four (4), directly neighboring negative features and vice versa except for those features located at a border or the perimeter of the map. In this case the block structure corresponding to the map is called "embossed-debossed". However, in a different example embodiment, the map may comprise only positive features, and in this case the block structure corresponding to the map is called "embossed-embossed". In a further different example embodiment, the map may comprise only negative features, and in this case the block structure corresponding to the map is called "debossed-debossed". In an even further embodiment, the map may comprise positive and negative features that occur with one or more sequences of polarity that are more complex than explained herein above in this paragraph, or even pseudo-random.

In a preferred embodiment of this invention, the features have overall lateral sizes in the (x,y)-plane of the solid piece in a range between 5 μm to 250 μm and heights along the z-axis of the solid piece in a range between 5 μm to 250 μm. The features are meant to alter optical-reflection properties of the surface-structured product by locally modifying the normal of the surface.

Figure 2:
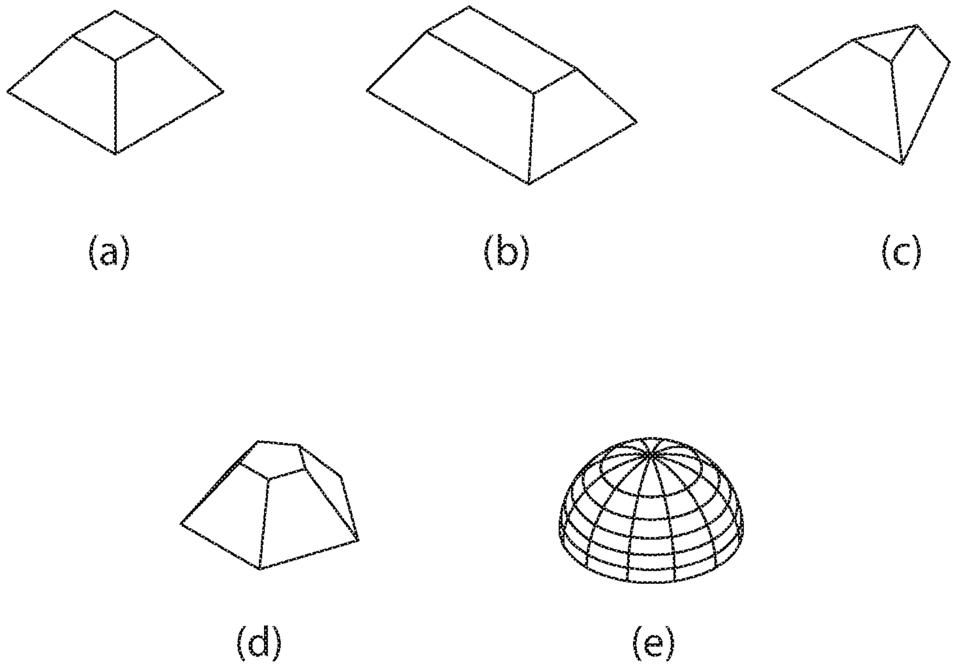
FIG. 2 contains an illustration of example features according to the invention.

FIG. 2 schematically illustrates examples of features, which may be considered to be base features, such as, (a) a truncated pyramid with quadratic base, (b) a truncated pyramid with rectangular base, (c) a truncated tetragon, (d) a truncated pentagon and (e) a half sphere. These examples are non-limitative and other shapes such as the non-truncated versions or a depleted truncated hemisphere (not illustrated in FIG. 2) may be considered as well. More generally, a feature can be described by a mathematical function z=f(x, y) where the z-axis is aligned with the normal of the surface of the solid piece (or substrate).

In the present invention, a subset of positions in the ordered map may be used to represent digital data comprising specific information. The block structure corresponding to this subset may be defined as a code-block structure. Conversely, a code-block structure is a block structure with modulated features, the positions of which are comprised in the ordered map.

In a preferred embodiment of this invention, an engraved symbol is considered a single element of the code-block structure obtained by modulation, i.e., a transcribing of an alphabet character profile into the base feature to obtain a modulated feature.

It is to be noted that the code-block structure may not necessarily be packed as densely as the map, the density being the count of modulated features of the code-block structure per surface unit. For example, it is typical but not necessarily always the case that in the case of an "embossed-debossed" map, the code-block structure only comprises features of a single polarity. In "embossed-embossed" or "debossed-debossed" maps, it is common that the code-block structure corresponds to a subset of the map that is packed more densely than the map itself, each feature of the code-block structure modulating one or more characters into a symbol.

FIGS. 3 to 9 demonstrate how positions of features corresponding to a code-block structure may be selected out of a map in various cases. For convenience, we will simply use in the following the term code-block structure to designate the specific positions of specific features corresponding to that code-block structure.

Figure 3:
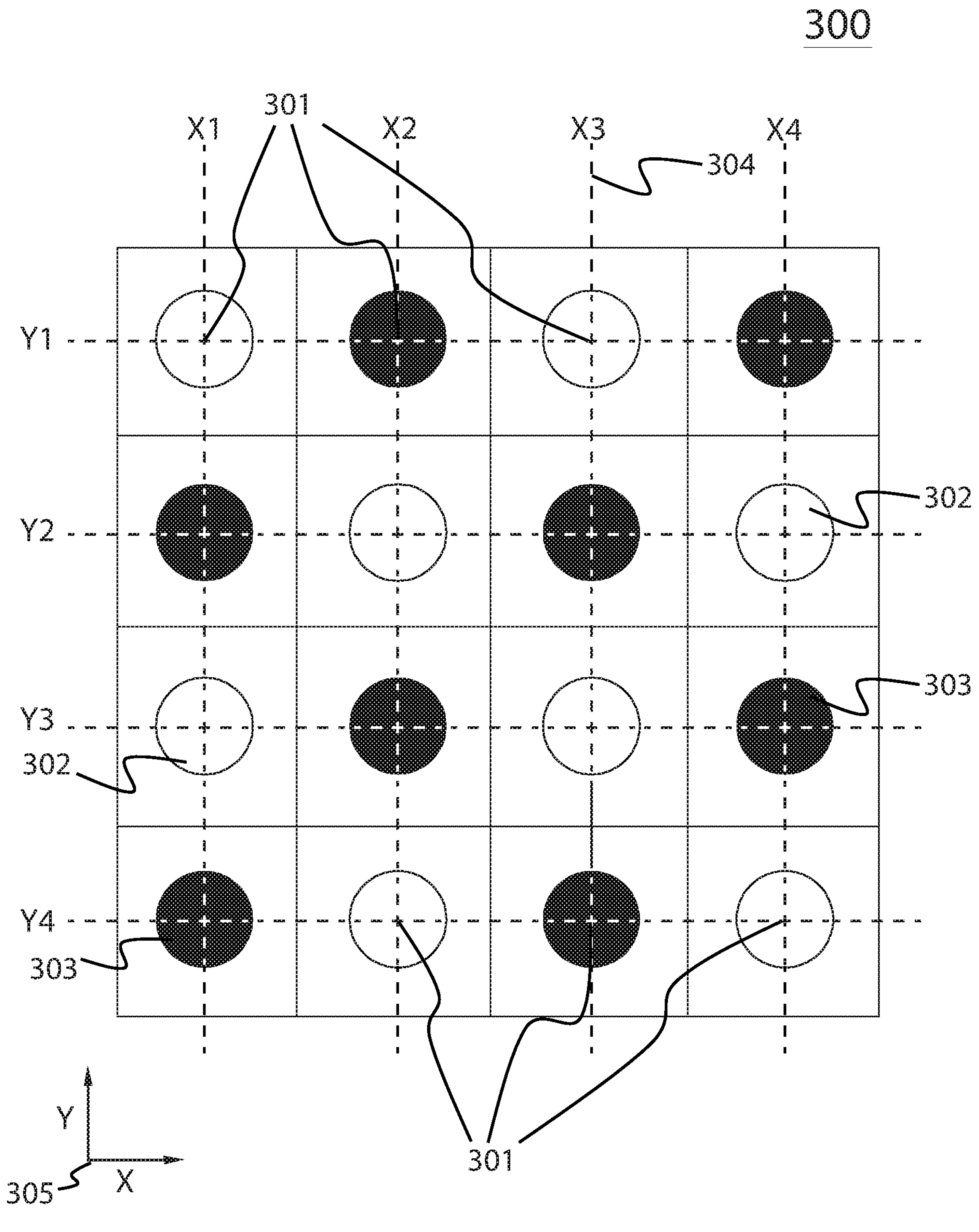
FIG. 3 illustrates an example of an ordered map of features along a regular grid according to the invention.

Referring to FIG. 3, this illustrates an example of a map 300 in which no code-block structure is selected. FIG. 3 illustrates a finite set of positions 301 on a surface of the solid piece or the substrate, the surface and the solid piece or the substrate not being illustrated. Any position on the surface may be expressed in a coordinate system 305. The positions 301 are those of features, i.e., in the example of FIG. 3 a first type of feature 302 illustrated in white circles, and a second type of feature 303 illustrated in textured circles. The feature 302 may be of negative polarity, while the feature 303 may be of positive polarity. The map 300 arranges the first type of features 302 and the second type of features 303 along a regular grid 304, meaning that the features 302 and the features 303 are arranged in the regular grid 304, each of the features always having the same distance from their neighboring features, no matter where in the grid they are located. The regular grid 304 in FIG. 3 is constructed with rows perpendicular to columns, and has a size of four rows and four columns. Table 1 contains all information of the map 300, including for each of the 16 features 301 a set of coordinates in the coordinate system 305 and its type. The coordinates for each feature 301 are of a center of the feature, in the present example the center of the circle.

TABLE 1 description of map 300

| Feature Number | X-coordinate | Y-coordinate | Type of feature |
|---|---|---|---|
| 1 | X1 | Y1 | first |
| 2 | X2 | Y1 | second |
| 3 | X3 | Y1 | first |
| 4 | X4 | Y1 | second |
| 5 | X1 | Y2 | second |
| 6 | X2 | Y2 | first |
| 7 | X3 | Y2 | second |
| 8 | X4 | Y2 | first |
| 9 | X1 | Y3 | first |
| 10 | X2 | Y3 | second |
| 11 | X3 | Y3 | first |
| 12 | X4 | Y3 | second |
| 13 | X1 | Y4 | second |
| 14 | X2 | Y4 | first |
| 15 | X3 | Y4 | second |
| 16 | X4 | Y4 | first |

Figure 4:
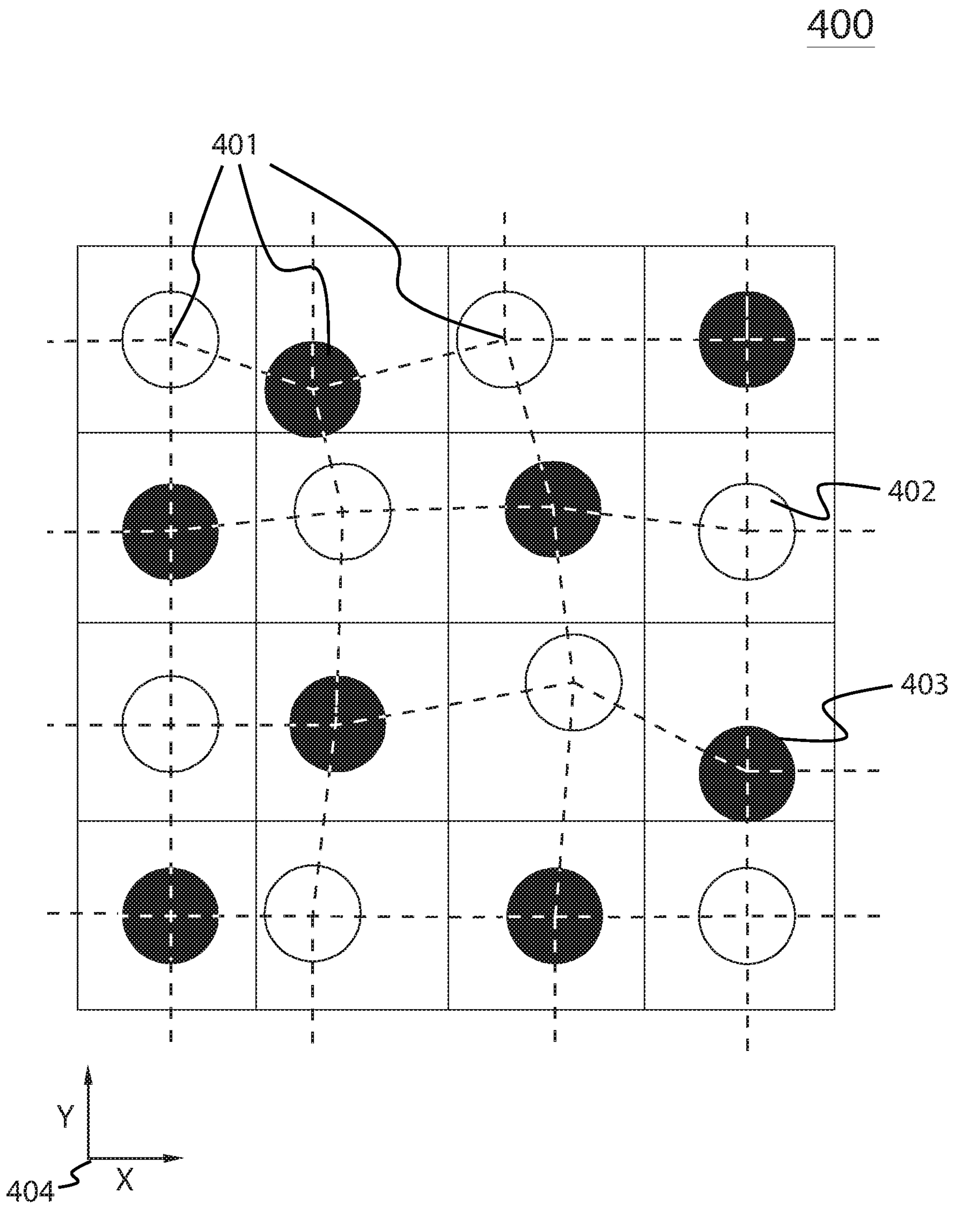
FIG. 4 illustrates an example of an ordered map of features along a randomized grid according to the invention.

Referring to FIG. 4, this illustrates an example of a map 400 in which no code-block structure is selected. FIG. 4 illustrates a finite set of positions 401 on a surface of the solid piece or the substrate, the surface and the solid piece or the substrate not being illustrated. Any position on the surface may be expressed in a coordinate system 404. The positions 401 are those of features, which similar as in FIG. 3 may be of a first type of feature 402 illustrated in white circles, and of a second type of feature 403 illustrated in textured circles. The first type of feature 402 may be of negative polarity, while the second type of feature 403 may be of positive polarity. The map 400 is arranged along a randomized grid. Features 402 and 403 have distances from their neighboring features that depend on the randomized position that they respectively occupy in the randomized grid.

Figure 5:
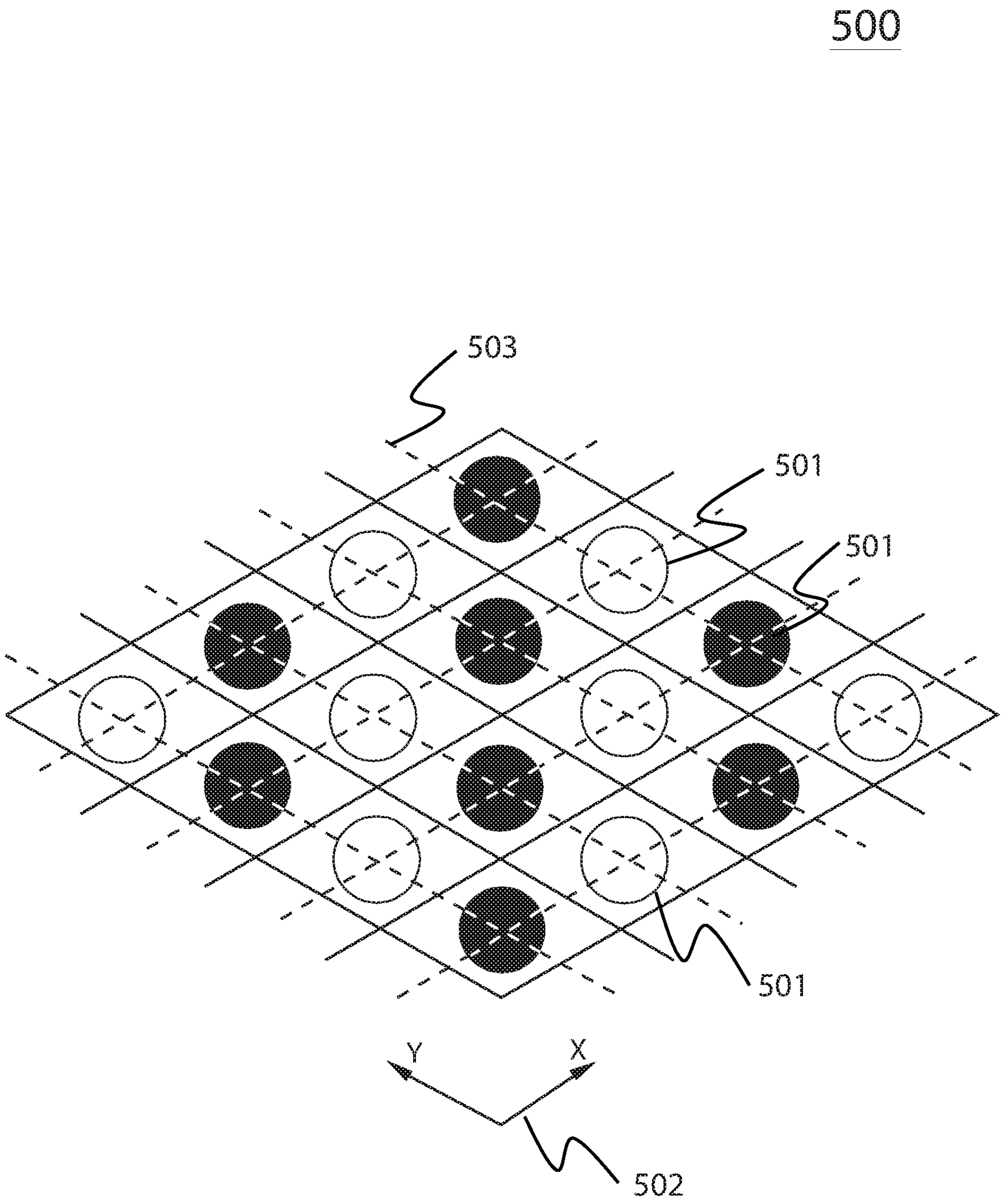
FIG. 5 illustrates a further example of an ordered map features along a regular grid according to the invention.

Referring to FIG. 5, this illustrates yet a further example of a map 500 is which the features 501 are arranged along a regular grid 503, but in contrast to FIG. 3, the rows and columns in which the features 501 are arranged are not perpendicular. The rows are parallel from one to the other, and the columns are also parallel from one to the other. Any position on the surface may be expressed in a coordinate system 502, in which conveniently the x-axis and y-axis are oriented according to the rows and columns.

Figure 6:
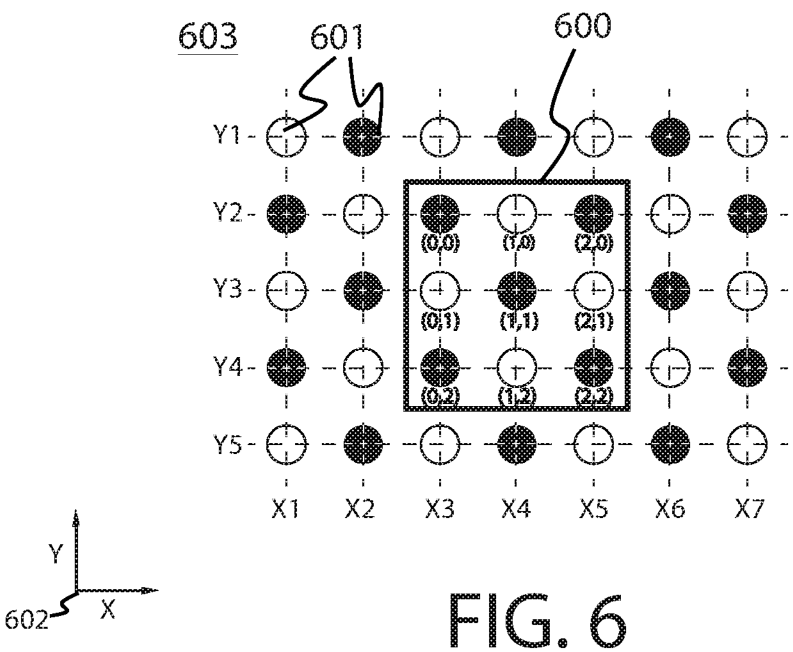
FIGS. 6 to 9 illustrate code-block structures selected out of an ordered map of features according to examples of the invention.

FIG. 6 illustrates a code-block structure 600. In this case, the code-block structure 600 gathers contiguous features selected out of an ordered map 603 of features 601 ordered in a regular grid. Any position on the surface may be expressed in a coordinate system 602. The code-block structure 600 comprises nine (9) features referenced with code-feature IDs (0,0), (1,0), (2,0), (0,1), (1,1), (2,1), (0,2), (1,2) and (2,2). The code-block structure 600 comprises features of a first type illustrated with white circles and features of a second type illustrated with textured circles, just like the remaining features of the ordered map 603. However, the features of the code-block structure 600 may comprise modulated features, each corresponding to a symbol that is the transcription of a character of an alphabet. The modulated features may be represented by, e.g., textured circles only, these being potentially all the textured circles of the code-block structure 600, or by a subset of the textured circles of the code-block structure. Alternatively, the modulated features may be represented by white circles only. In a further alternative, the modulated features may be represented through textured circles and white circles. In some cases, a modulated feature may in fact correspond to a base feature, and hence it may be defined preferably to not to correspond to any symbol. Assuming for the sake of example that the alphabet being used is the Latin alphabet comprising characters a, b, c, d, . . . , x, y, z, then any modulated feature may correspond to a symbol that is the transcription of one of these characters. Assuming further, for example, that the modulated features are represented by textured circles having code-feature IDs (0,0), (2,0), (1,1), (0,2) and (2,2), and the modulated features are ordered in the same order of appearance as indicated in the latter list, then it is possible to use the modulated features to convey data, such as the word «echos» consisting in the sequence of symbols corresponding to the letters e, c, h, o and s. Table 2 contains an extract of the map 603, describing how the word «echos» is placed in the ordered map 603.

TABLE 2 extract of description for map 603.

| Feature number | x-coordinate | y-coordinate | Type of feature | Code feature ID | Symbol/character |
|---|---|---|---|---|---|
| . . . | | | | | |
| 8 | X1 | Y2 | textured | none | none |
| 9 | X2 | Y2 | white | none | none |
| 10 | X3 | Y2 | textured - modulated | (0, 0) | e |
| 11 | X4 | Y2 | white - base | (1, 0) | none |
| 12 | X5 | Y2 | textured - modulated | (2, 0) | c |
| 13 | X6 | Y2 | white | none | none |
| 14 | X7 | Y2 | textured | none | none |
| 15 | X1 | Y3 | white | none | none |

TABLE 2-continued extract of description for map 603.

| Feature number | x-coordinate | y-coordinate | Type of feature | Code feature ID | Symbol/character |
|---|---|---|---|---|---|
| 16 | X2 | Y3 | textured | none | none |
| 17 | X3 | Y3 | white - base | (0, 1) | none |
| 18 | X4 | Y3 | textured - modulated | (1, 1) | h |
| 19 | X5 | Y3 | white - base | (2, 1) | none |
| 20 | X6 | Y3 | textured | none | none |
| 21 | X7 | Y3 | white | none | none |
| 22 | X1 | Y4 | textured | none | none |
| 23 | X2 | Y4 | white | none | none |
| 23 | X3 | Y4 | textured - modulated | (0, 2) | o |
| 24 | X4 | Y4 | white - base | (1, 2) | none |
| 25 | X5 | Y4 | textured - modulated | (2, 2) | s |
| 26 | X6 | Y4 | white | none | none |
| 27 | X7 | Y4 | textured | none | none |
| 28 | X1 | Y5 | white | none | none |
| . . . | | | | | |

As may be read in Table 2, the features with numbers 10, 12, 18, 23 and 25 are modulated features representing symbols for characters e, c, h, o, and s. These features have code-feature IDs and are part of the code-block structure 600. Remaining features of the code-block structure are base features and do not represent any symbols. Features outside the code-block structure 600 have a similar structural and visual appearance as those from the code-block structure 600 however comprise no modulated features among the features represented in textured circles.

A packing density of the code-block structure 600 is maximum for the map of FIG. 6, meaning that each feature 601 of the code-block structure 600 is adjacent to at least another feature 601 of the code-block structure 600.

Figure 7:
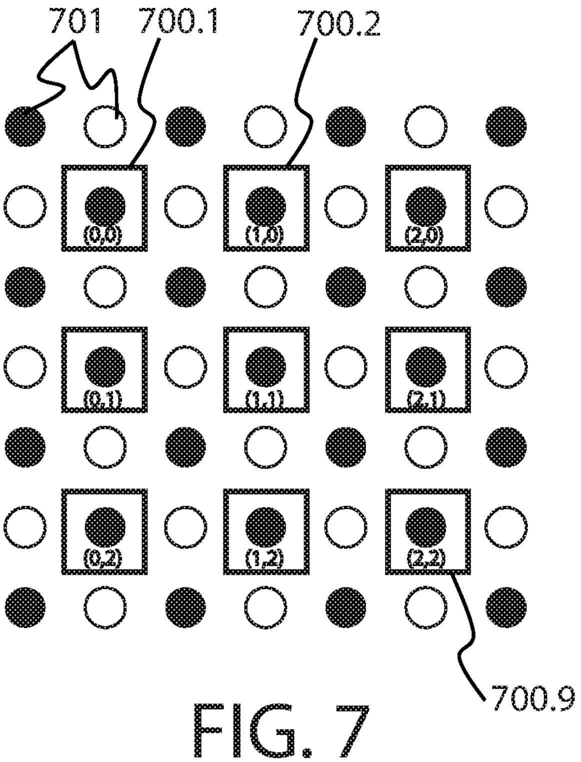

FIG. 7 illustrates a code-block structure 700.1-700.9 selected out of an ordered map of features 701 in a regular grid, similar to the regular grid represented in FIG. 6. Similar as in FIG. 6, the code-block structure 700.1-700.9 comprises 9 features referenced with code feature IDs (0,0), (1,0), (2,0), (0,1), (1,1), (2,1), (0,2), (1,2) and (2,2). However, the features of the code-block structure 700.1-700.9 are all of a same type, illustrated here by a textured circle. Each feature of the code-block structure 700.1-700.9 is separated from its nearest feature of the code-block structure by at least another feature 701 of the map, which is not part of the code-block structure 700.1-700.9. Hence, a density of the features of the code-block structure 700.1-700.9 is less than that of the features of the code-block structure 600 of FIG. 6, meaning that there are less features of the code-block structure per area unit of the surface on which the map is intended to be realized.

Figure 8:
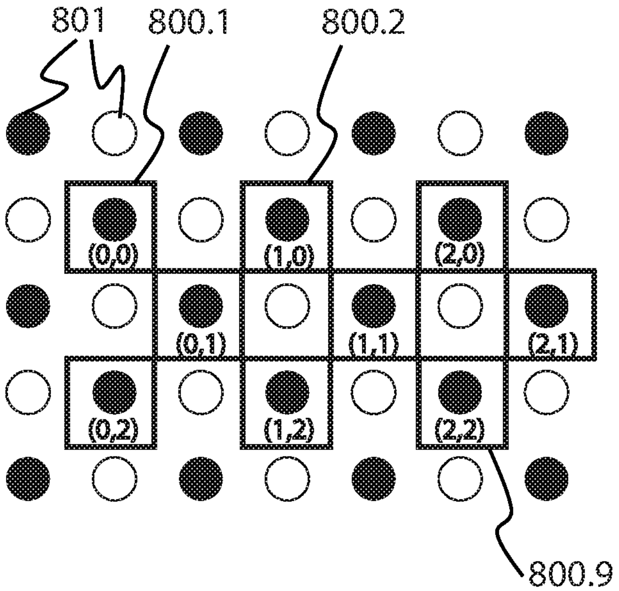

FIG. 8 illustrates a code-block structure 800.1-800.9 selected out of an ordered map of features 801 in a regular grid, similar to the regular grids of FIGS. 6 and 7. The code-block structure 800.1-800.9 comprises nine (9) features referenced with code feature IDs (0,0), (1,0), (2,0), (0,1), (1,1), (2,1), (0,2), (1,2) and (2,2). Like in FIG. 7, the features of the code-block structure are all of the same type, illustrated here by a textured circle. In contrast to FIG. 7, the features (0,0), (0,1), and (0,2), which in FIG. 7 belong to a same column, in FIG. 8 do not belong to a same column, and are therefore said to be non-gid aligned.

Figure 9:
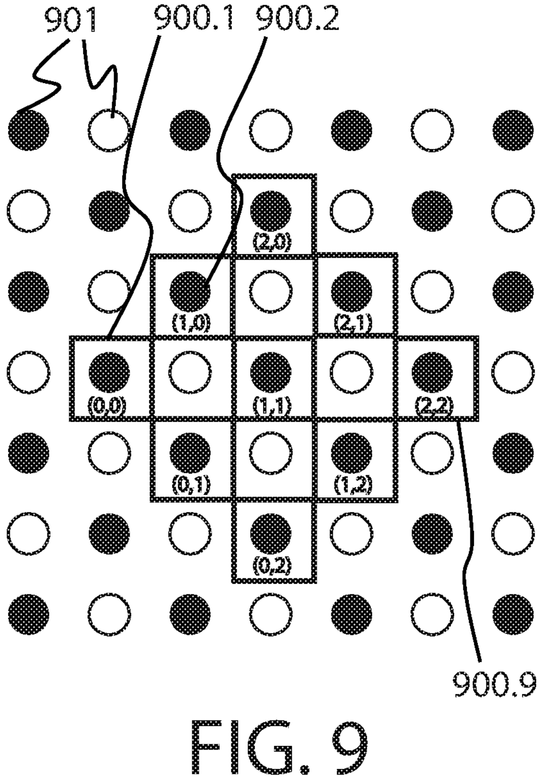

FIG. 9 illustrates a code-block structure 900.1-900.9 selected out of an ordered map of features 901 in a regular grid, similar to the regular grids already encountered in FIGS. 6 to 8. The code-block structure 900.1-900.9 comprises nine (9) features referenced with code feature IDs (0,0), (1,0), (2,0), (0,1), (1,1), (2,1), (0,2), (1,2) and (2,2) Like in FIGS. 7 and 8, the features of the code-block structure are all of the same type, illustrated here by a textured circle. In the example of FIG. 9, the features are grid aligned, but in contrast to FIG. 7, the rows of features from the code-block structure in FIG. 9 are grid aligned on lines at 45° from the rows depicted in FIG. 7.

In a preferred embodiment of the present invention, the code-block structure itself aligns on a two-dimensional grid, such as the ones depicted in FIGS. 3, 5, 6, 7, 8, and 9 and unlike the one depicted in FIG. 4. In the latter, the engraved features are arranged in a randomized manner.

The features comprised in the code-block structure preferably are modulated features and base features. Each modulated feature and base feature has respectively a three-dimensional modulated-feature profile and a three-dimensional base feature profile. Each of the modulated-feature profiles is the result of applying a corresponding modulation by means of a modulation to one of the three-dimensional base feature profiles, according to a specific corresponding information. In this sense, and when used to transcribe data in the code-block structure, each modulated feature is a symbol, which in turn is a transcription of a character of an alphabet. The alphabet is a collection of characters, which are distinct objects of well-defined elementary data. In other words, the modulated features are used as symbols to code data, and they are then included in the code-block structure. Thereby, at least a part of the data is transcribed by the code-block structure of modulated features. Eventually, the code-block structure constitutes a block structure corresponding to the at least one part of the data.

The modulated features, which are part of a block structure, are arranged according to an ordered map. This is a way that allows knowing where each of the modulated features may be found on the engraved solid piece, in order to reconstitute and detect the symbols used in the code-block structure and hence recover the data carried on the surface of the solid piece. In a preferred embodiment, a code-block structure of, e.g., 33 lines and 33 rows comprises within itself a small set of, e.g., 64 modulated features that represent a specific pattern, which may be a synchronization pattern. These modulated features may be specific symbols of the alphabet, however in the present example these modulated features are not used to encode the data itself. At the time of the optical read-out of the code-block structure, an image sensor acquires an image; the image is transmitted subsequently to an image processor; then, the image processor analyzes the acquired image and correlates the synchronization pattern therein with an application-specific synchronization pattern in order to determine the reference or origin for a decoding operation. The image processor is programmed such that, after it correlates the synchronization pattern, it knows where the modulated features, i.e., the symbols may be found on the engraved solid piece and begins to detect/demodulate the symbols used in the code-block structure, decodes the newly arranged information and hence recovers the information on the surface of the solid piece.

Figure 10:
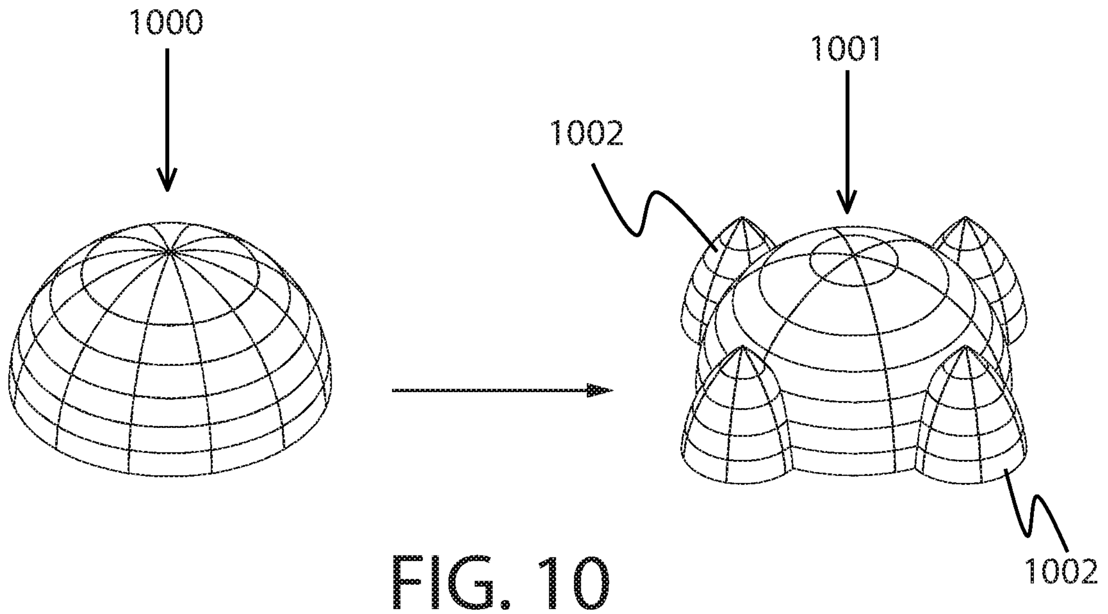
FIGS. 10 and 11 illustrate respectively an example of a base feature and a corresponding modulated feature according to the invention.

Referring now to FIG. 10, this shows an example of a base feature 1000 and a corresponding modulated feature 1001 that may be obtained after applying a modulation to the base feature 1000 (modulation operation not illustrated in FIG. 10). A base feature may be considered an elementary component of a block structure. As explained in the glossary herein above, the base feature is an engraved elementary three-dimensional topographical element engraved into the surface of the solid piece. In the example of FIG. 10, the base feature 1000 is illustrated schematically as a positive feature with the shape of a half-sphere. The modulated feature may be understood as a base feature onto which a modulation function has been applied, the modulation being, in the sense of the present invention, the act of purposely transcribing a character of an alphabet into a controlled physical three-dimensional topographical structure. Referring again to the glossary, the modulated feature is an engraved three-dimensional topographical element, whose three-dimensional modulated-feature profile is the result of applying a feature profile by means of a specific operation, i.e., the modulation to a base-feature profile. In a very simple case, not illustrated in FIG. 10, the feature profile may have no effect of change of the base feature, and hence the modulated feature may be identical to the original base feature. However, in the example of FIG. 10, the modulation has the effect of adding a plurality of half cones 1002 to the half-sphere basic feature 1000.

Figure 11:
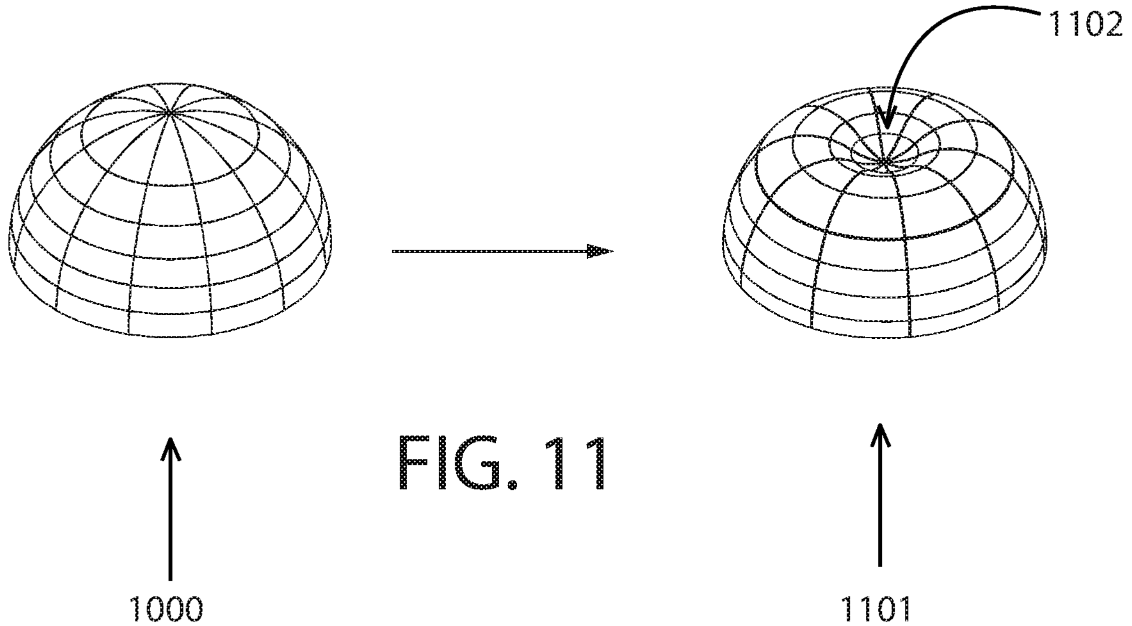

Referring to FIG. 11, this shows the same example of a base feature 1000 as in FIG. 10. and a corresponding modulated feature 1101 that may be obtained after applying a modulation to the base feature 1000 (modulation operation not illustrated in FIG. 11). The modulation has the effect of adding a crater 1102 to the half-sphere basic feature 1000.

In line with the present invention, the modulation of a basic feature may be made comparatively as weak as possible, as will be explained in the following. In this context, the term "weak" means that a two-dimensional integral over the entire feature of the angle difference between the normal of the modulated feature and that of the base feature on the surface-structured product, is below a certain threshold in human vision capability. The purpose is to generate a modification of the base feature such that an interaction between the impinging light and the modulated feature looks very similar to the interaction between the impinging light and a base feature in view of the human eye. In such a configuration, under most lighting conditions, the modulated features look very similar to the base features and therefore the respective symbols corresponding to the modulated features in the code-block structure of modulated features are imperceptible to the human eye. However, if an appropriate image of the code-block structure comprising modulated features is taken with a digital camera, and subsequently processed using a computerized system such as, e.g., a smartphone, a tablet, a PC, an embedded controller, it is possible to reveal the original information carried in the code-block structure of the image. In addition to the modulated features looking very similar to the base features, a number of additional factors make it even more difficult to differentiate a detection of modulated features from a detection of base features. These additional factors comprise for example:

- diffuse lighting;
- amplitude variations in reflected light between light reflected by a modulated feature and light reflected by a base feature below a threshold perceptible to the human eye;
- outshining of reflection originating from modulated features by reflections produced by possible other surrounding base features, modulated features and surfaces;
- color-dependent sensitivity of the human eye.

At the same time as the individual modulated features carry information in a manner imperceptible to the human eye, a plurality of the modulated features may also be used by themselves or together with base features to create an aesthetic ensemble perceptible to the human eye. Such aesthetic ensemble may for example be a surface of the surface-structured product or solid piece that defines for example a logo, a repetitive motif, or a pictorial representation of an object.

Typically, by adding redundancy in the form of, e.g., a forward error-correcting (FEC) code, the code-block structure may be constructed in such a way that the initial information coded into the code-block structure can still be recovered if any one of the following occurs:

- a perfect reliability in the modulated-feature read-out is not achievable;
- the modulated features of the code-block structure is erased, i.e., superseded by another embossed motif that does not carry the code-block structure;
- only a part of the code-block structure is in the field of view of the camera.

A further typical application of the present invention is to authenticate a product by taking a picture of the surface-structured product or its packaging, processing the picture to identify possible code-block structures and extract the information contained in such code-block structures.

Various modulation approaches may be used, resulting in corresponding more or less influence in light impinging on the modulated feature, depending on the target digital means for reading the image, e.g., a smartphone with a comparatively low-resolution camera in a relatively poor lighting condition or a high-end professional camera with perfect, directional lighting.

The following exemplifies types of modulation that are of typical use.

It is of convenience to differentiate a few typical yet general cases:

- multiplicative modulation;
- (scaled) z-offsetting modulation;
- additive modulation;
- xy-offsetting modulation.

Figure 12:
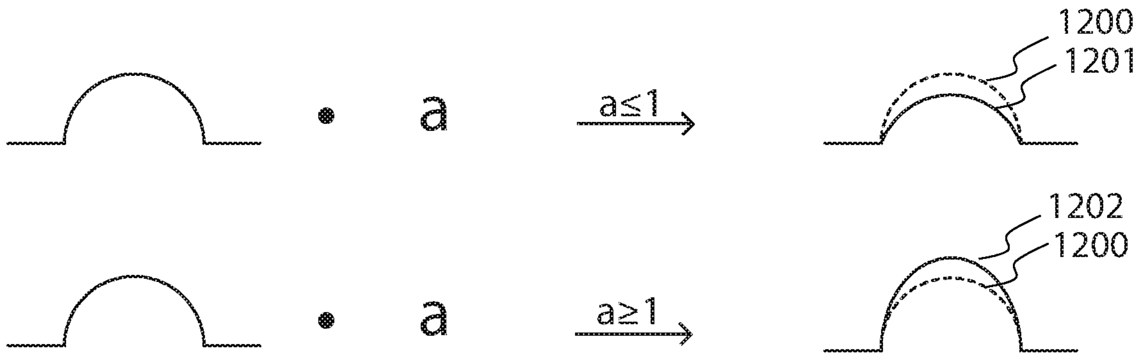
FIG. 12 schematically explains multiplicative modulation according to examples of the invention.

The multiplicative modulation allows height modulation or polarity flipping (positive to negative and vice-versa) of the complete base feature. Referring to FIG. 12, this contains schematic examples of multiplication modulation by a factor a. Two examples are illustrated therein, one in which $a<1$ and hence the height modulation reduces the height of the base feature 1200 to obtain a modulated feature 1201 with reduced amplitude, and another one in which $a>1$ and hence the height modulation increases the height of the base feature to obtain a modulated feature 1202.

Figure 13:
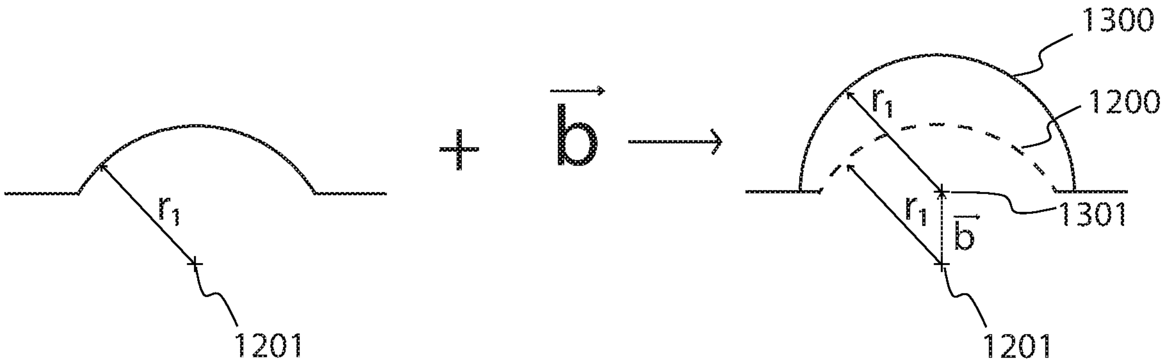
FIG. 13 schematically explains z-offsetting modulation according to an example of the invention.

The offsetting modulation permits a height modulation of the complete base feature. It is clamped generally to zero, as it is common practice to select positive-only features or negative-only features approach. FIG. 13 illustrates an example of z-offsetting modulation of spherical base feature where the center 1201 is translated by vector b in z-direction to the new center 1301. Hence, the base feature 1200 is translationally elevated by an amount of vector b to obtain modulated feature 1300. This supposes that the base feature 1200 possesses a virtual shape below the surface from which the base feature is elevated.

Figure 14:
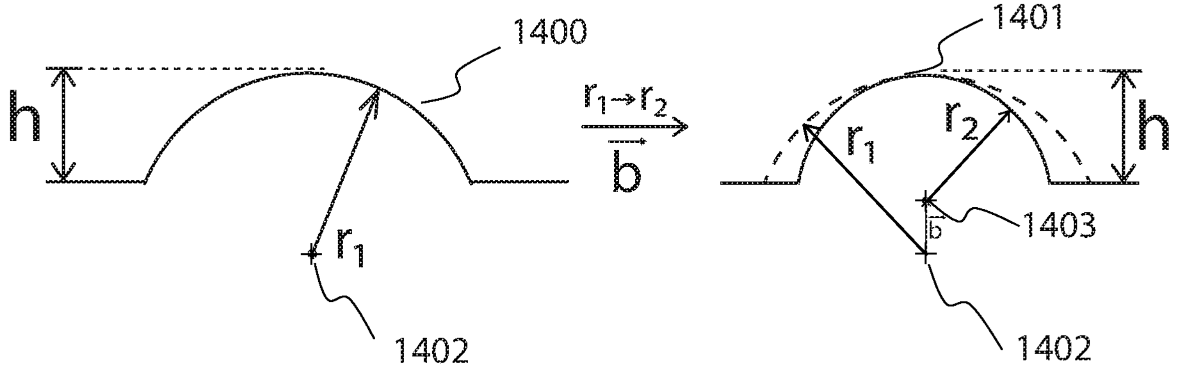
FIG. 14 schematically explains a scaled z-offsetting modulation according to a further example of the invention.

FIG. 14 illustrates an example of scaled z-offsetting modulation in which the radius of a sphere is modified while the part extending over the surface by a height h is kept constant. In the illustrated example, a radius r1 of a base feature 1400 is reduced such that the radius becomes r2 for a modulated feature 1401 while at the same time the center 1402 is translated to center 1403 by vector $\vec{b}$.

Figure 15:
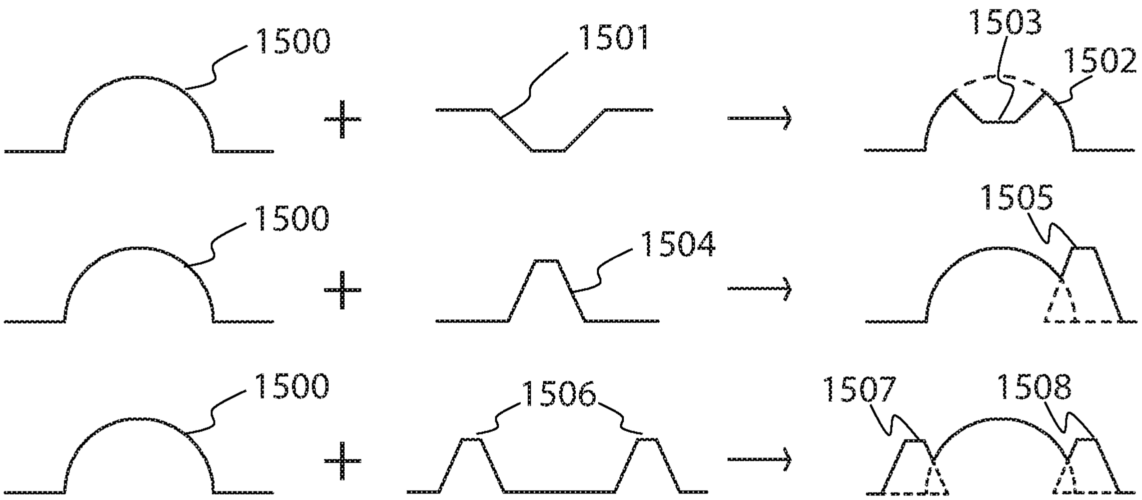
FIG. 15 schematically explains an additive modulation according to examples of the invention.

The additive modulation, which also covers the subtraction case, allows for adding a position-dependent structure to the base feature. FIG. 15 demonstrates three (3) examples of such additive modulations, where one or several cone features are added onto a hemispherical base feature 1500 at various positions. In the example illustrated in the upper part of FIG. 15, a cone feature 1501 added to the base feature 1500 results in a modulated feature 1502 having a cone shaped cavity 1503 on top of the hemispherical shape. In the middle part of FIG. 15, a further cone feature 1504 shaped as a positive feature is added to the base feature 1500 and results in the cone feature merging into a right side 1505 of the hemispherical shape. In the lower part of FIG. 15, two even further cone features 1506 shaped as two positive features distant from each other by less than a base diameter of the base feature 1500, results in the cone features merging into respective left 1507 and right 1508 sides of the hemispherical shape.

Figure 16:
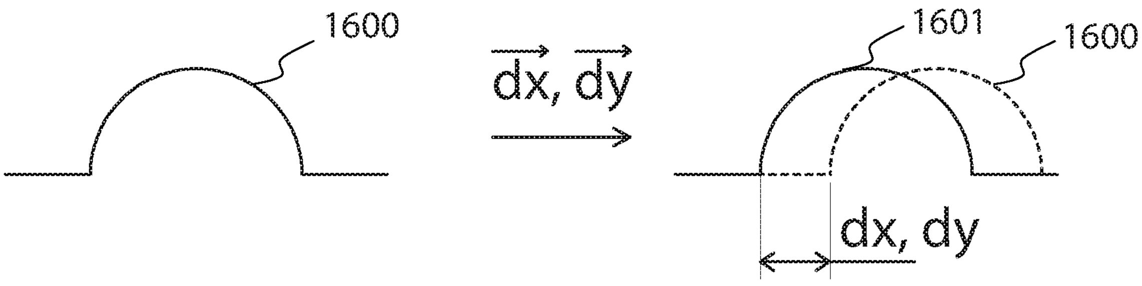
FIG. 16 schematically explains an xy-offsetting modulation according to a further example of the invention.

FIG. 16 demonstrates a further offsetting modulation, in which a modulated feature 1601 appears as a laterally moved version of base feature 1600 in the (x,y)-plane of the surface of the solid piece or surface-structured product, wherein the lateral movement is by a vector $\vec{d_x}$ and/or $\vec{d_y}$.

Various types of modulation may also be combined by modulating more than one parameter.

This might be desired to produce a stronger effect when required, e.g., a more pronounced effect on intensity of light reflected by the so-obtained modulated feature in order to facilitate a read-out and retrieval by means of a software-driven image-sensor/processor combination.

In a typical case, given a layout of features along a uniform grid such that two neighboring positions along either one of the main axis of the grid, are separated by a value d, a hemispherical base feature of amplitude 1 and a height h are modulated by one, two or four cones of truncated height h, base width w and angle to the normal theta, placed at (d/2,0), (−d/2,0), (0,−d/2) or/and (0, 0+d/2) relative to the central position of the sphere. See FIG. 10 for an example illustration of this case.

In another typical case, a single cone of inverse polarity than the hemispherical base feature but of any height h2 is placed in the center of the hemispherical base feature, i.e., at (0,0) relative to the central position of the hemispherical base feature. See FIG. 11 for an example illustration of this case.

Engraved Solid Piece

As previously explained the engraved solid piece may be either a tool or a surface-structured product. In either case, the engraving is made on a material surface.

Figure 17:
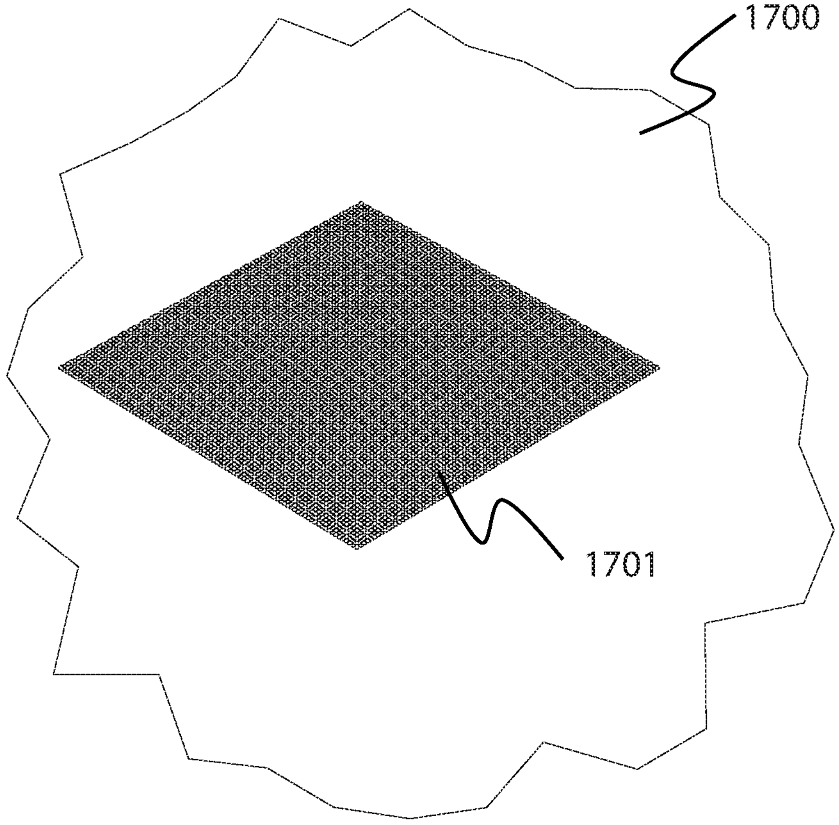
FIG. 17 illustrates a part of a surface of a tool or a surface-structured product covered by a plurality of block structures, according to an example of the invention.

FIG. 17 illustrates a part of a surface 1700 of a tool or surface-structured product. The surface 1700 is covered by a plurality of block structures, such as an exemplary block structure 1701 shown in FIG. 17. As explained in the glossary, the block structure 1701 is a spatially restricted collection of base features and/or modulated features, which are spread over the surface of the solid piece or the substrate according to a map. The overall shape of the block structure 1701 shown in FIG. 17 is a non-limitative example. The block structure may well have other shapes such as for example a disk, or any other shape representing an object, such as a company logo (not represented in FIG. 17). As a practical example, FIGS. 36A/B exhibit two microscope images of a tool surface representing base features and modulated features alongside each other a) top-view of the tool surface and b) angled view of the tool surface.

Figure 18:
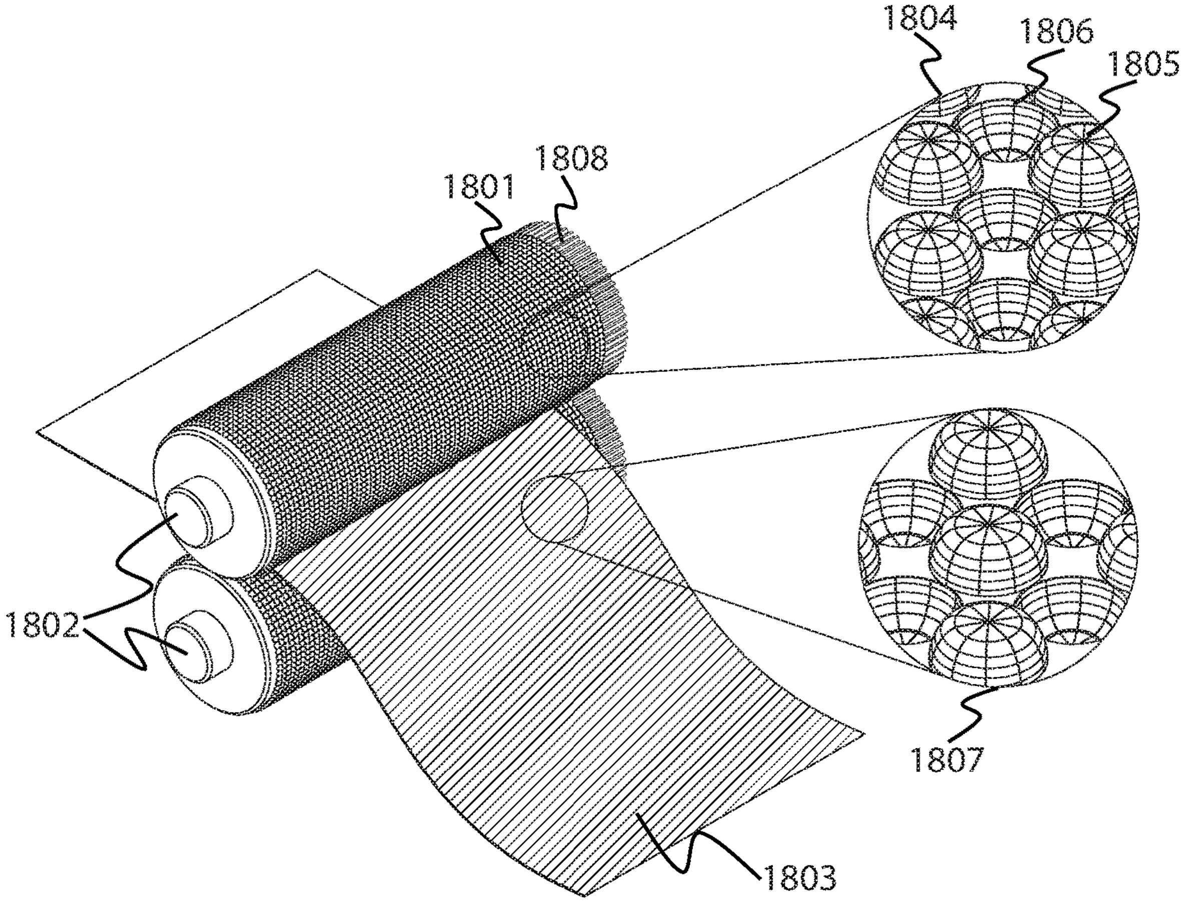
FIG. 18 illustrates an example synchronized embossing set-up with solid pieces according to the invention.

FIG. 18 illustrates an example in which a block structure 1801 is employed in an embossing head 1800, which comprises two embossing rollers 1802 and configured to emboss a foil product 1803. The two embossing rollers 1802 are configured as patrix/matrix roller pair, which may be synchronized by a synchronization gear 1808. A magnified excerpt 1804 of the block structure 1801 illustrates an example of positive features 1805 and negative features 1806 to be embossed. The part of the foil product 1803 having been embossed is shown as a hashed surface. A magnified excerpt 1807 of the foil product illustrates an example of embossed positive and negative features.

Figure 19:
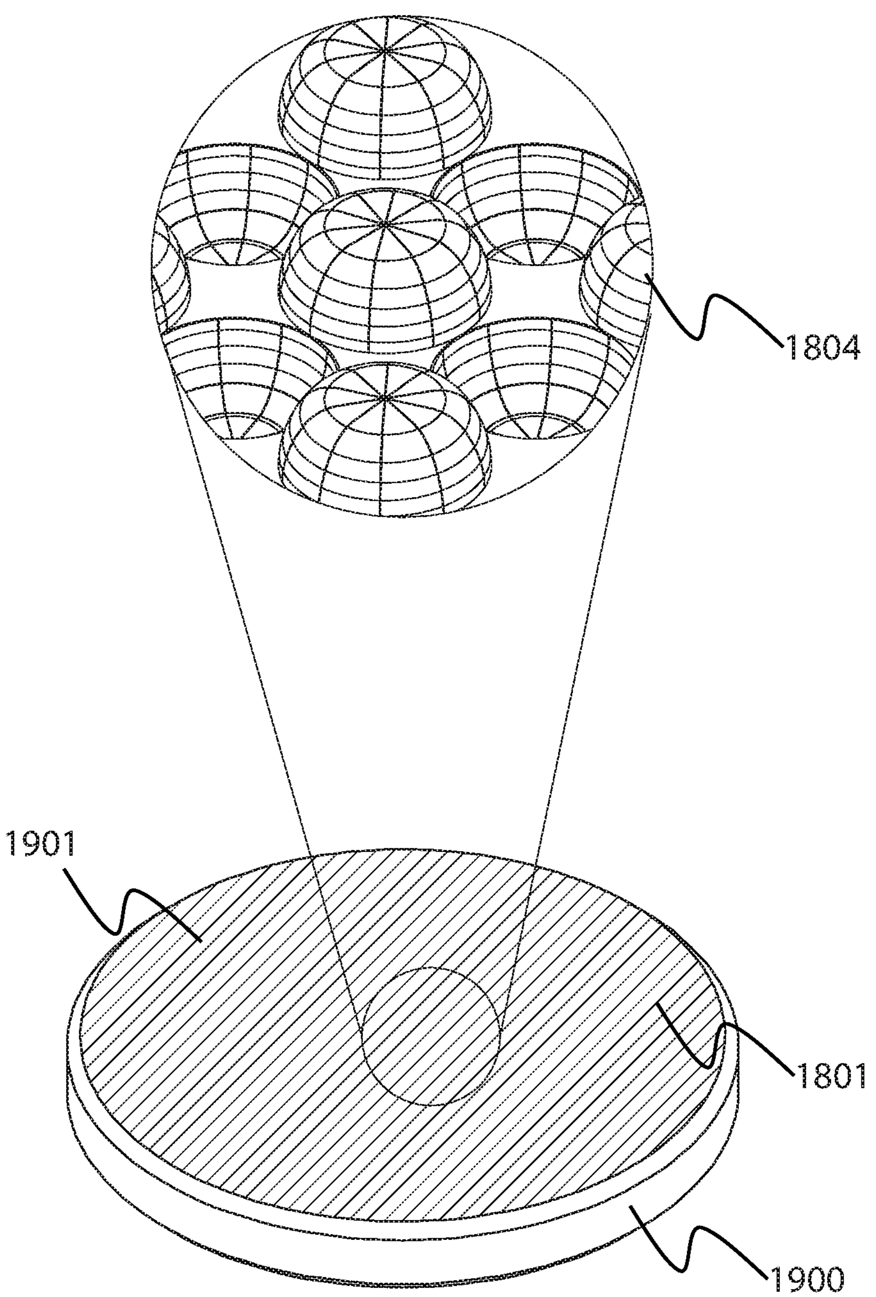
FIG. 19 illustrates an example solid piece in form of a surface-structured product, according to an example embodiment of the invention.

FIG. 19 illustrates an example in which the block structure 1801 is employed in an surface-structured product 1900, which is a disk-shaped object having an engraved surface 1901. A magnified excerpt 1804 of the block structure 1801 illustrates an example of positive features and negative features.

Figure 20:
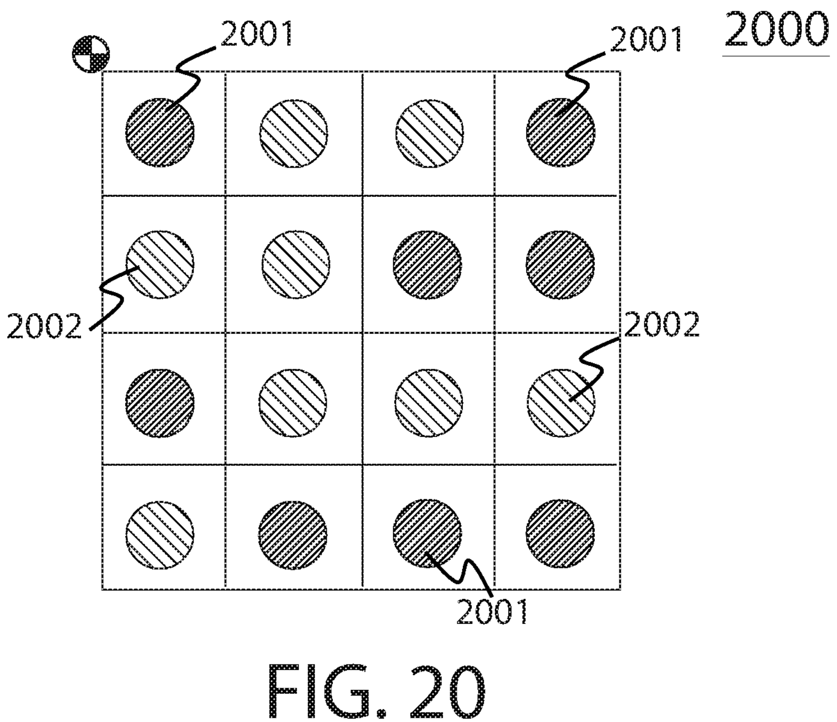
FIG. 20 illustrates an example embodiment of an ordered map for a block structure with modulated features and base features, according to the invention.
Figure 21:
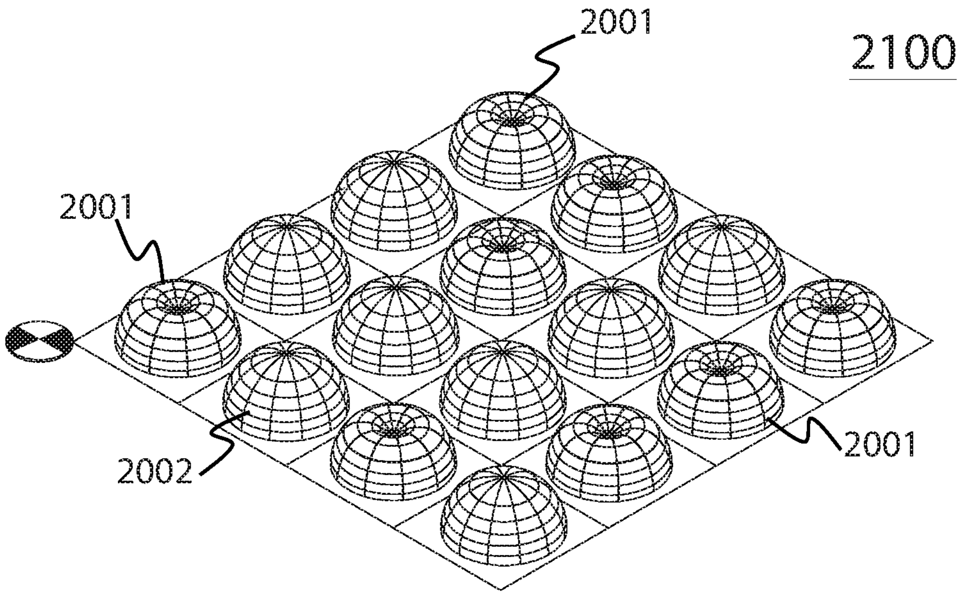
FIG. 21 shows the code-block structure resulting from the ordered map of FIG. 20.

FIG. 20 illustrates a part of a map 2000, which shows determined positions of modulated features 2001 and base features 2002 that correspond to a part of a code-block structure in a block structure, such as for example the block structure 1801 of FIG. 18 or 19. FIG. 21 illustrates the part 2100 of the code-block structure that contains the illustrated map 2000 of FIG. 20 of modulated features 2001 and base features 2002. In this illustrated example, the modulated features 2001 are obtained according to the modulation illustrated in FIG. 11.

In a general embodiment, the engraved solid piece carries data comprising specific information on one of its surfaces. Hence, the surface is covered by a plurality of block structures, comprising at least a first block structure. Each block structure, including the first block structure, is a spatially restricted collection of modulated features and base features. These modulated features and base features are spread over the surface of the engraved solid piece according to a map.

Each modulated feature and each base feature has respectively a three-dimensional modulated-feature profile and a three-dimensional base-feature profile. Each of the modulated-feature profiles is the result of applying a corresponding modulation by means of a modulator to one of the three-dimensional base-feature profiles, according to a specific corresponding information. Each modulated feature corresponds to a symbol that is a transcription of a character of an alphabet. The alphabet is a collection of characters, which are distinct objects of well-defined elementary data. Each of the base features is an engraved elementary three-dimensional topographical element of the surface. Each of the modulated features is an engraved three-dimensional topographical element of the surface. At least a part of the data is transcribed by a code-block structure of modulated features, the code-block structure thereby constituting at least a part of a block structure corresponding to the at least one part of the data. The modulated features of the first block structure are arranged according to a first ordered map, the first ordered map being a first finite ordered set of first positions of the modulated features of a first code-block structure on the surface, the first code-block structure corresponding to a first part of the data, and the first ordered map is further configured to arrange the modulated features of the first block structure to constitute an aesthetic ensemble on the surface and render the respective symbols corresponding to the modulated features of the first code-block structure imperceptible to the human eye, but retrievable by means of a software-driven image-sensor/processor combination.

FIGS. 22A-22D illustrate 4 examples of embossed foil-products: in FIG. 22A a first embossed foil product 2201 comprising embossed base structures having a hemispherical shape and regularly aligned on a grid, as shown in the magnified excerpt, in FIG. 22B a second foil product 2202 comprising embossed modulated features similar to those illustrated in the block structure 2100 of FIG. 21, except that here they result from embossing the block structure 2100 in the foil product 2202, in FIG. 22C a third foil product 2203 comprising embossed modulated features such as the ones shown in FIG. 10, and in FIG. 22D an embossed foil product 2202 similar to that of FIG. 22B, i.e., with modulated features embossed therein, except for an aesthetic motive superposed on them, represented here as the word "LOGO", all embossed in the foil-product 2202. It is to be noted that the aesthetic motive may not comprise any modulated features nor base features, but is surrounded at least by modulated features.

Figure 23:
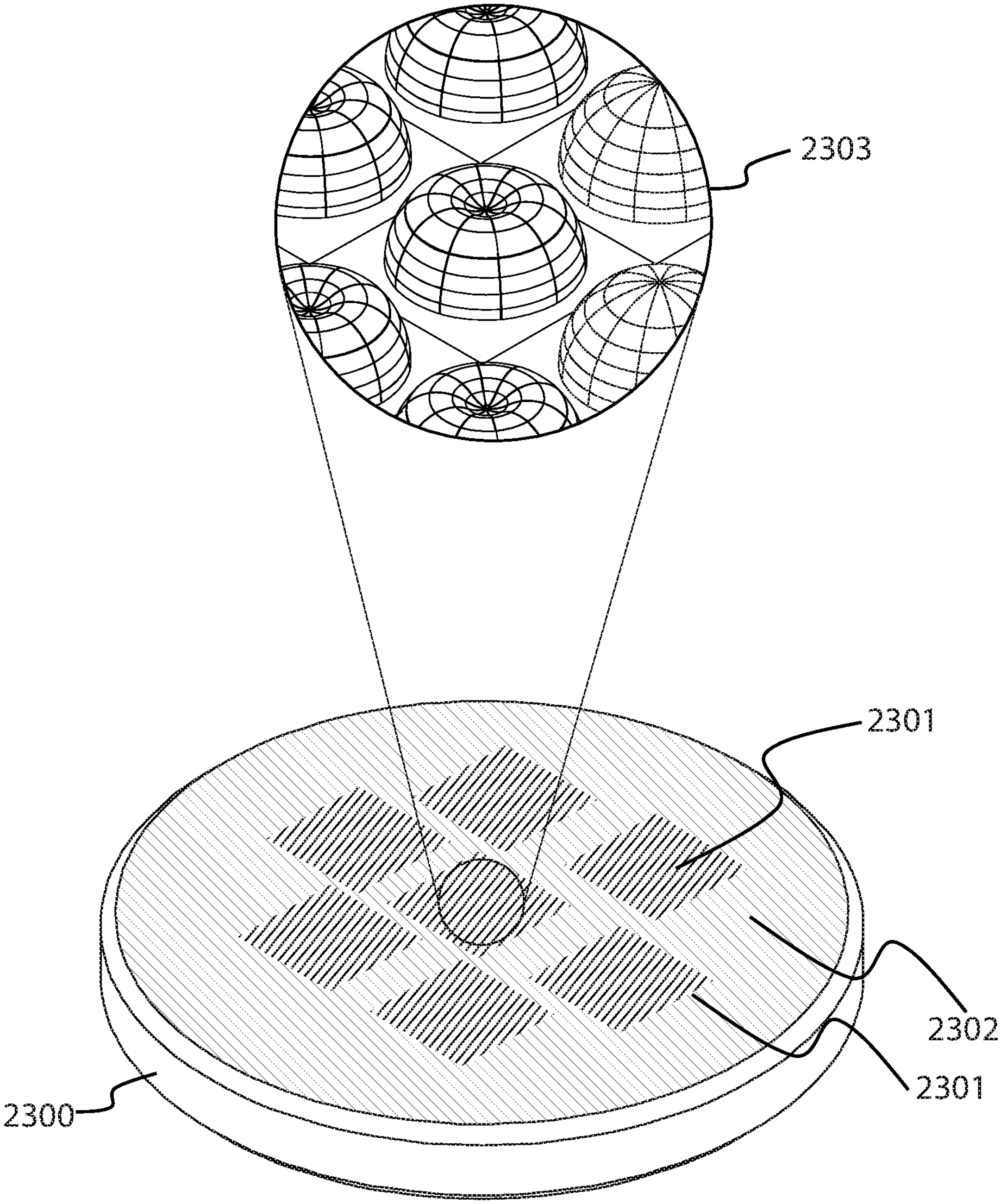
FIG. 23 illustrates an example of a surface-structured product with engraved block structures according to the invention.

FIG. 23 illustrates an example of a surface-structured product 2300 with engraved block structures on one of its surfaces. the block structures comprise a plurality of first code-block structures 2301 in which the modulated features are arranged according to a first ordered map, which is a first finite ordered set of first positions of the modulated features of a first code-block structure on the surface, the first block structures 2301 corresponding each to a first part of data (data and code-block structure not illustrated on the surface of the surface-structured product 2300 in FIG. 23). The first block structures 2301 are surrounded by a second block structure 2302, which is represented in FIG. 23 by a surface hashed differently as the surfaces illustrating the first block structures 2301. The second block structure 2302 is a second spatially restricted collection of exclusively a plurality of at least one of the base features (base features of the second block structure not illustrated in FIG. 23), which are arranged on the surface of the surface-structured product 2300 according to a second pattern. The first block structures 2301 are arranged on the surface of the surface-structured product, such that they or more precisely the modulated features that they comprise constitute an aesthetic ensemble on the surface. The aesthetic ensemble is shown here as an ensemble of seven (7) approximately square patches. The aesthetic ensemble is completed by the second block structure 2302 which is shown to surround the patched of first block structures 2301. FIG. 23 further illustrates a magnified part 2303 of a first block structure 2301 with modulated features and base features.

Figure 24:
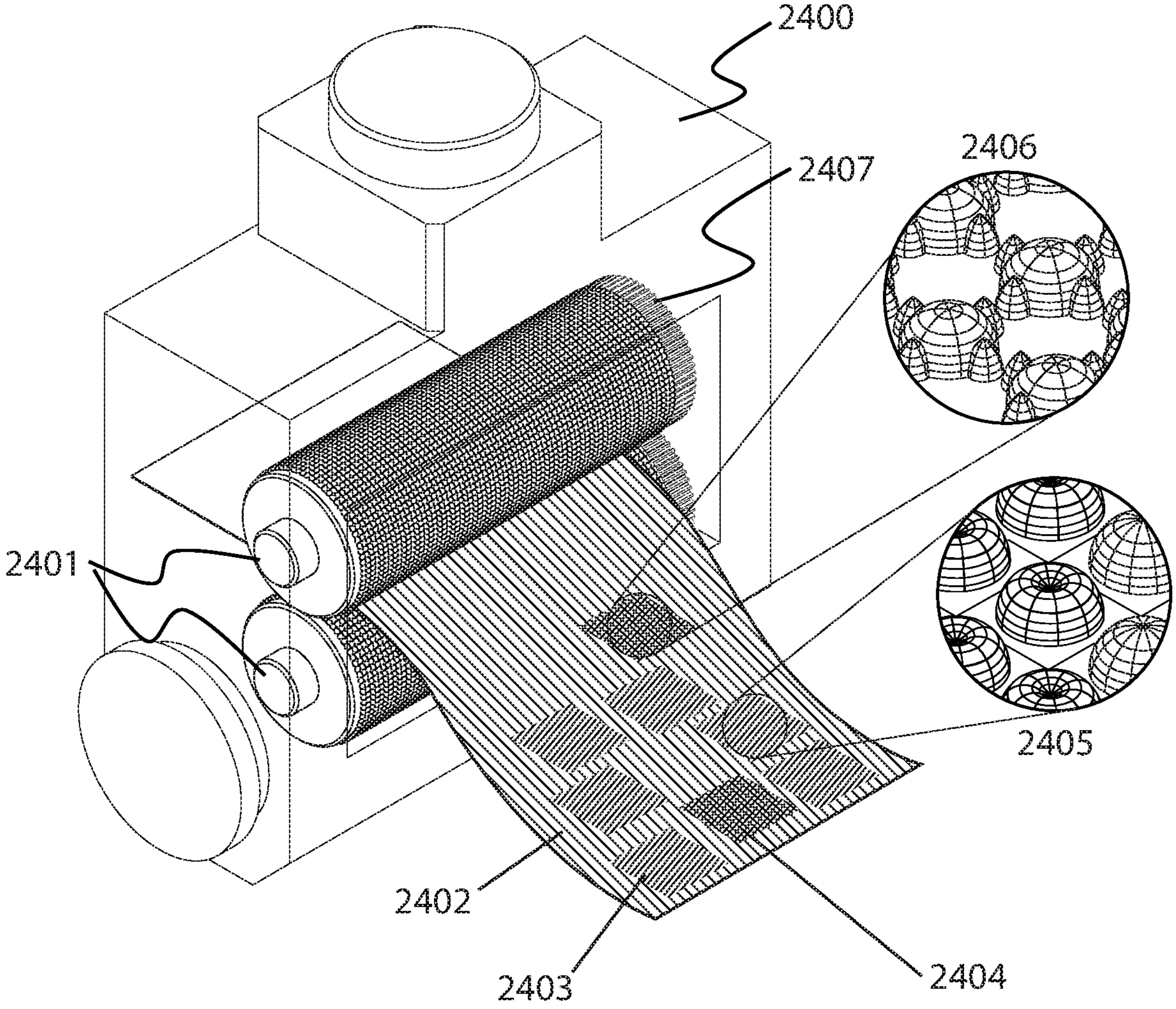
FIG. 24 illustrates a synchronized embossing set-up with an optional quick-exchange cassette, and an embossed foil product according to an example embodiment of the invention.

FIG. 24 illustrates a synchronized embossing head 2400, inside which an optional quick-exchange cassette (not explicitly illustrated for better reading) is configured to house at least two engraved solid pieces 2401 with optional synchronization gears 2407, in which each engraved solid piece has a cylindrical symmetry, and is configured as an embossing tool for a transfer of modulated features and/or base features into a substrate, in the case of FIG. 24 this is a foil product. The surface of one of the solid pieces 2401, i.e., one of the embossing tools, is covered by block structures, which result in the embossing of the modulated features and base features comprised therein into the foil product. The illustrated example shows three (3) different types of embossed block structures, namely a first embossed block structure 2402 comprising embossed base features only, a second embossed block structure 2403 comprising first modulated features and base features as illustrated in the magnified excerpt 2405 and a third embossed block structure 2404 comprising second modulated features as illustrated in the magnified excerpt 2406. It is apparent that the embossed first, second and third block structures do not overlap. Furthermore, the block structures are arranged along a randomized grid.

Figure 25:
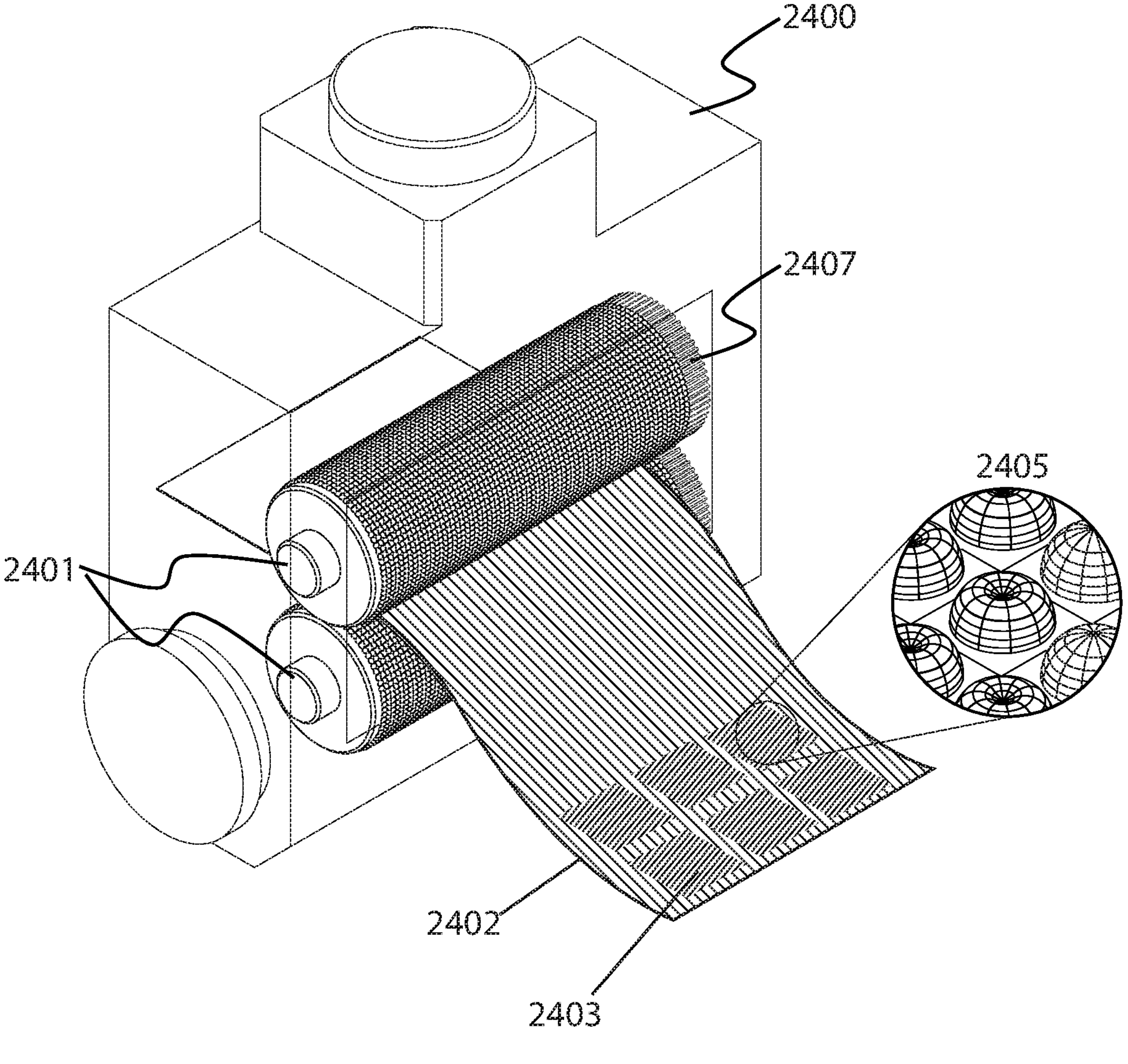
FIG. 25 illustrates a further synchronized embossing set-up with an even further example of embossed foil product according to an embodiment of invention.

FIG. 25 illustrates a similar synchronized embossing head 2400 with a similar optional quick-exchange cassette as in FIG. 24, in which the block structures engraved in the solid pieces 2401 result in the embossed block structures 2402 and 2403, which do not overlap, similarly as illustrated in FIG. 24. The block structures 2402 and 2403 respectively may correspond to differently ordered maps, and the block structures respectively ordered maps are arranged along a regular grid.

Figure 26:
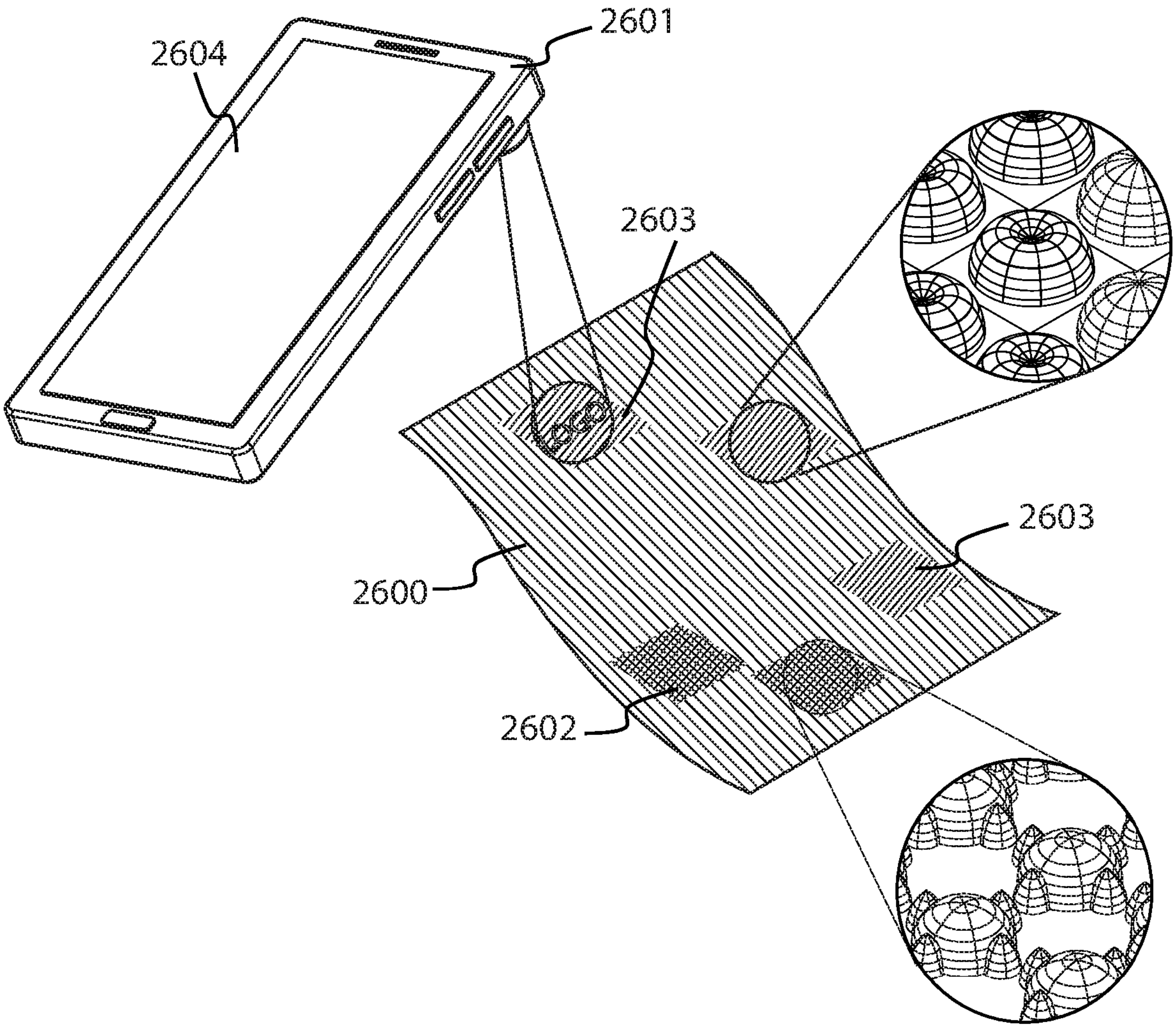
FIG. 26 illustrates an example of a set-up for reading out modulated features from block structures embossed in a foil-product according to an embodiment of the invention.
Figure 27:
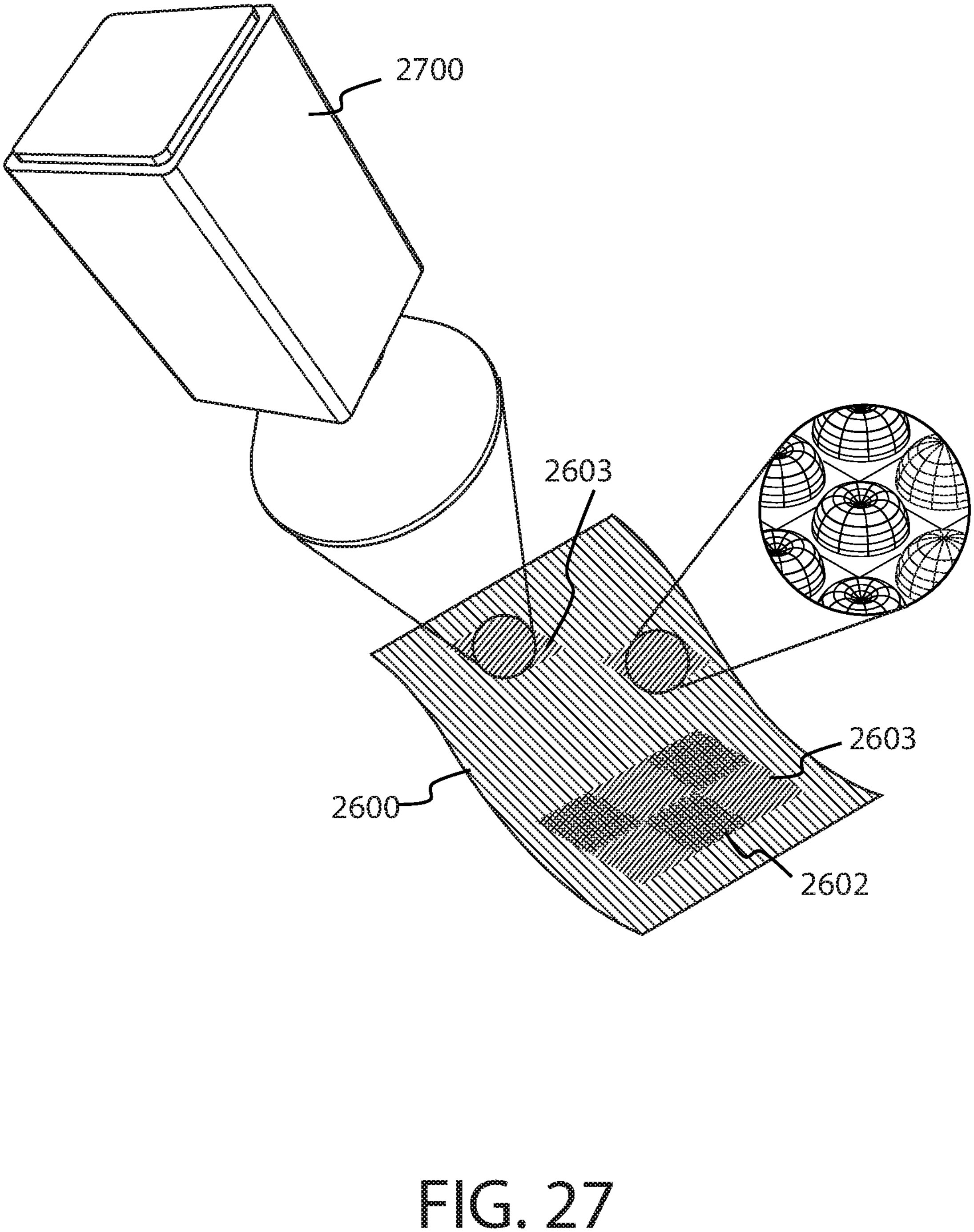
FIG. 27 illustrates a further example of a set-up for reading out modulated features according to an embodiment of the invention.

FIGS. 26 and 27 show examples of devices 2601 and 2700 used to read and retrieve the positions of modulated features from the code-block structures and block structures, e.g., a code-block structure 2602 comprising a type A of modulated features, a code-block structure 2603 comprising a type B of modulated features, and a block structure 2603 comprising type B of modulated features and an aesthetic motive superposed on them, represented here as the word "LOGO", all embossed in a foil-product 2600. It is noted that the aesthetic motive may not comprise any modulated features nor base features, but is surrounded at least by modulated features of type B, which are used to code data, which in turn is detected by the devices 2601 and 2700 and displayed on visualization means 2604 and 2704 of the respective devices. In both cases, the reading is done using light reflected by the block structures (impinging light subsequently reflected by the block structures not illustrated in FIGS. 26 and 27) and captured by an optical reading system of a smartphone 2601 in FIG. 26 or of a camera 2700 in FIG. 27. Both, smartphone 2601 and camera 2700, comprise or are attached to means and software to analyze an image taken from the block structure, and process it in order to decode the data and the specific information comprised in it, as carried in the block structures. On the smartphone 2601, the decoded data may be displayed eventually on the respective visualization means 2604.

Figure 28:
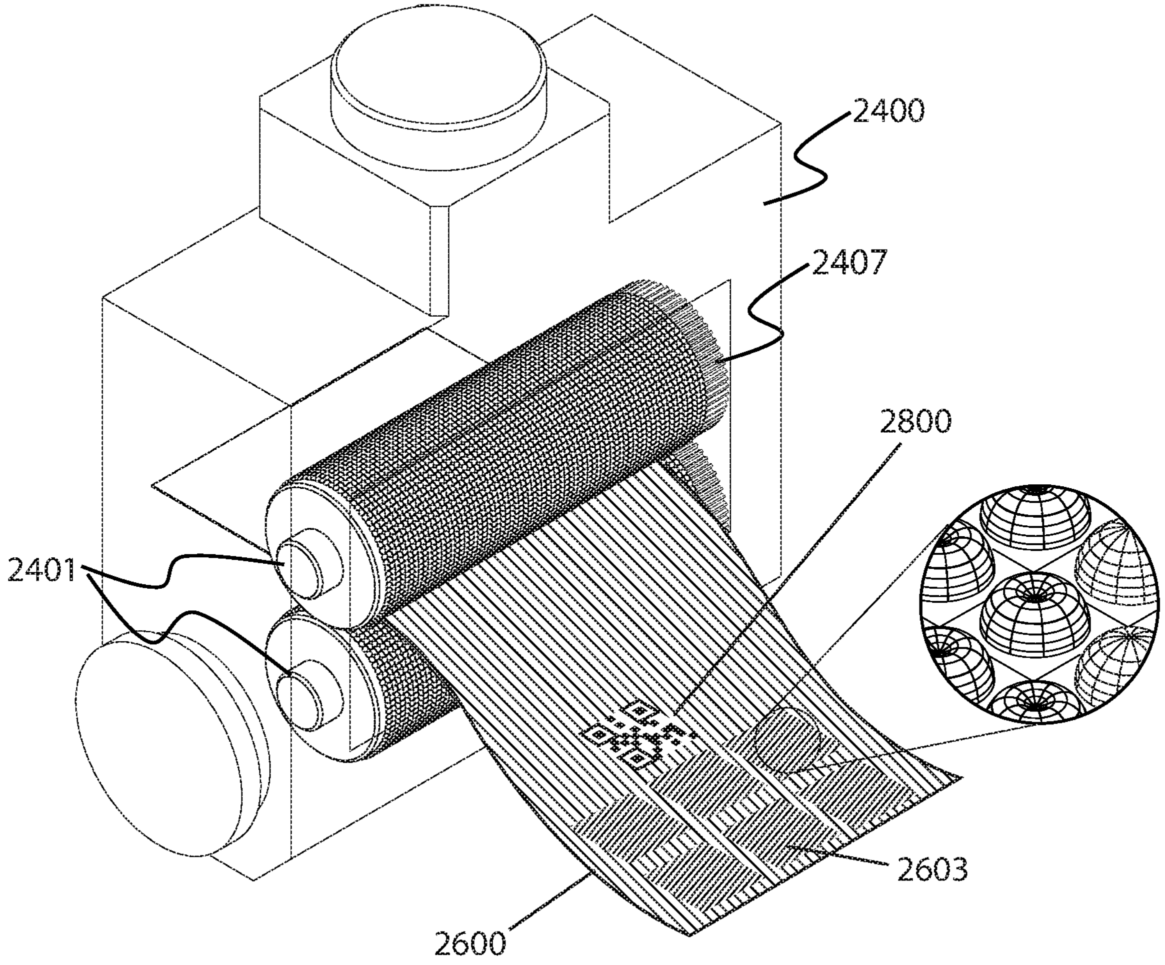
FIG. 28 illustrates an example use case of the block structure according to the invention.

FIG. 28 shows a further example of a synchronized embossing head 2400 similar to that already discussed for FIGS. 24 and 25, and an embossed foil-product 2600 comprising block structures 2603 similar as in FIGS. 26 and 27. A QR-code 2800 is created on the surface of the foil-product 2600 as an aesthetic motive, such that its constituents comprise surfaces that do not comprise any modulated features nor base features. The QR-code 2800 may thus be read-out as a simple aesthetic feature and decoded as such in an already well-known manner, without involving any analysis that may be used to detect and analyze modulated features.

Figure 29:
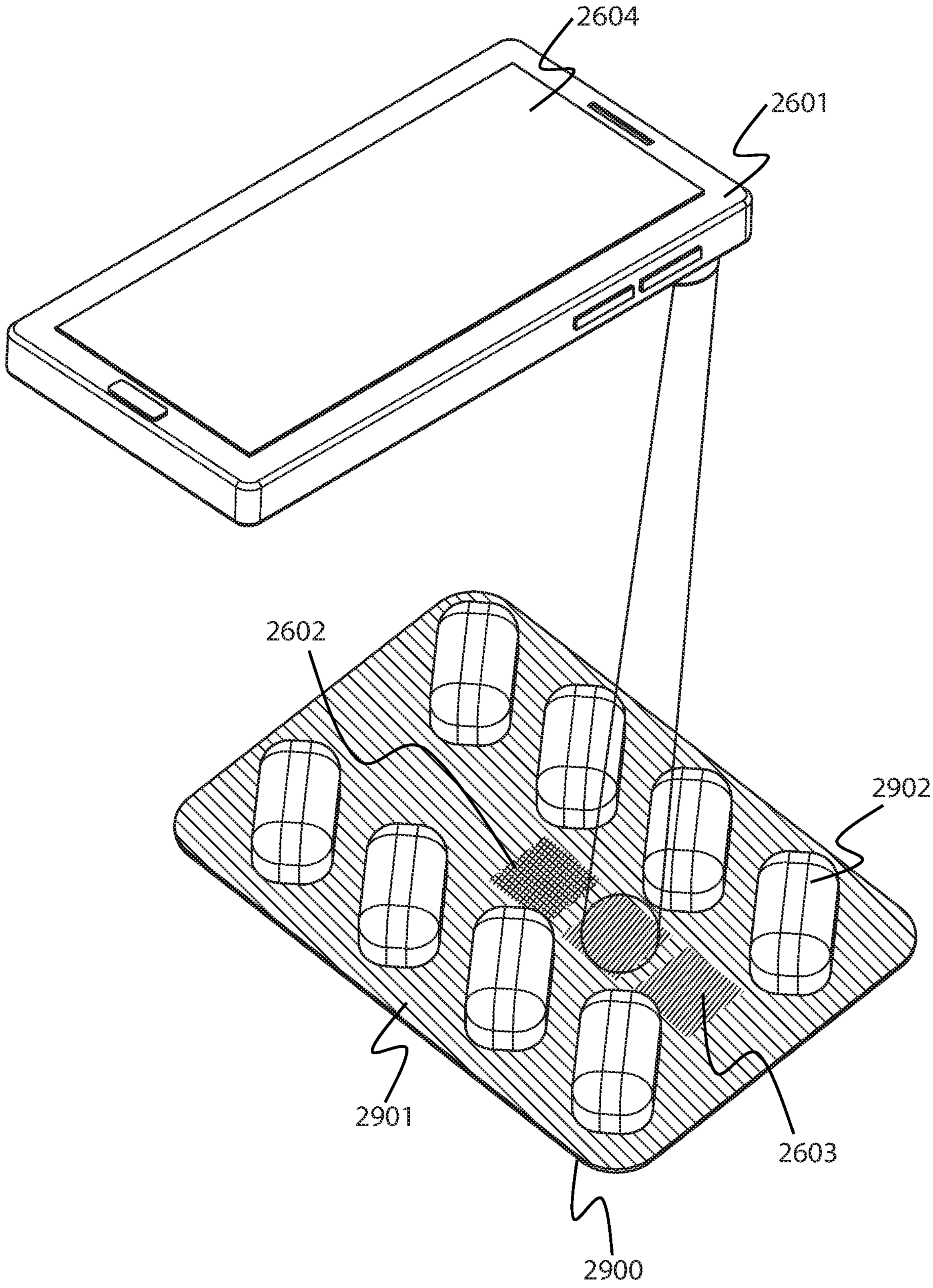
FIG. 29 illustrates an example use case of the block structure according to the invention.

FIG. 29 illustrates an example of a product in the form of a blister product 2900, for packaging pills, liquid-filled pods or any other blister-packed product 2902, these being surrounded by engraved base features 2901. The blister product 2900 further comprises block structures 2602 and/or 2603 similar as in FIGS. 26 and 27, which enable to carry data. The data may for example allow determining the authenticity of the blister 2900 and/or providing information about the pills, liquid-filled pods or other blister-packed product 2902. The block structures 2602 and/or 2603 may be read out for example by means of a smartphone 2601, and the result of the processed read-out of the block structures 2602 and/or 2603 may be displayed on visualization means 2604.

Figure 30:
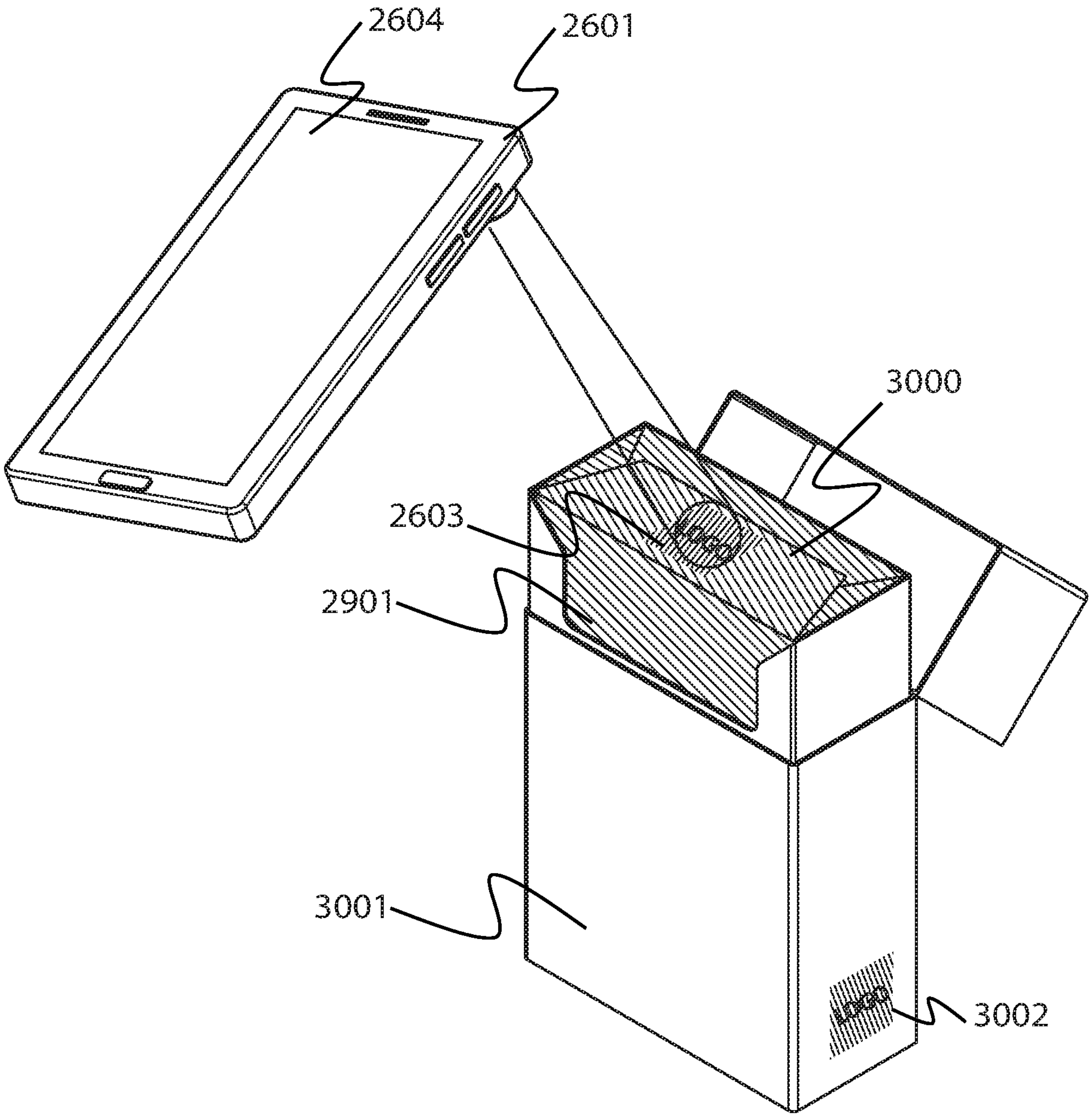
FIG. 30 illustrates an example use case of the block structure according to the invention.

FIG. 30 illustrates a further example of case use for a product, more precisely an inner liner 3000 of an outer package 3001, e.g., for cigarettes. The inner liner foil material 3000 is embossed with base features 2901 and at least a block structure 2603 comprising modulated features and an aesthetic motive superposed on them, represented here as the word “LOGO”. It is to be noted that the aesthetic motive may not comprise any modulated features nor base features, but is surrounded at least by modulated features, which are used to code data, which in turn is detected by the device 2601 and displayed on the visualization means 2604 of the device 2601. FIG. 30 also illustrates an optional duplicate embossing 3002 of the at least one block structure 2603 that comprises the aesthetic motive superposed on the modulated features, embossed into the material of the outer package 3001. The optional duplicate embossing 3002 may for example be useful for a purpose of anti-counterfeiting and forensic authentication.

It is noted that while the outer package 3001 resembles a cigarette package in the example of FIG. 30, it may in fact be a secondary outer package for any type of product, e.g., food, jewelry, pharmaceutical drugs, confectionary etc. in cardboard, stiffened paper laminate or any other suitable foil material. The outer package 3001 may in addition be shrink-wrapped into a (transparent) polymer film as is customary in the packaging industry (not illustrated in FIG. 30). This may be realized such that a read-out of the block structure 3002 remains possible after shrink-wrapping the outer package 3001.

Above-mentioned embossing methods and surface-structured products are generally suitable to be implemented or obtained out of an online-production line, digital press, or traditional converter.

Figure 31:
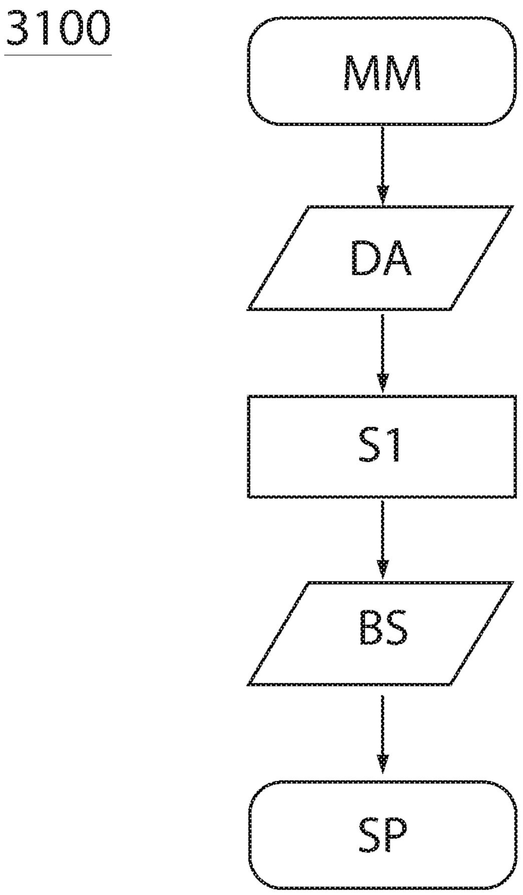
FIG. 31 contains a flowchart illustrating a method for manufacturing an engraved solid piece according to an embodiment of the invention.

FIG. 31 contains a flowchart 3100 illustrating a method for manufacturing MM an engraved solid piece SP configured for carrying data DA comprising information, the data being carried on a surface of the engraved solid piece. The data DA, which is transcribed by a code-block structure of modulated features, whereby the code-block structure thereby constitutes a block structure corresponding to the data, is engraved S1 on the surface as a plurality of block structures BS, which comprise at least a first block structure, whereby each block structure BS is a spatially restricted collection of modulated features and base features, which are spread over the surface of the engraved solid piece, each modulated feature and each base feature having respectively a three-dimensional modulated-feature profile and a three-dimensional base-feature profile, each of the modulated-feature profiles being the result of applying a corresponding modulation to one of the three-dimensional base-feature profiles, according to a specific corresponding information, each modulated feature further corresponding to a symbol, which is a transcription of a symbol of an alphabet, the alphabet being a set of characters, which are distinct objects of a well-defined elementary data, each of the base features being an engraved elementary three-dimensional topographical element of the surface, each of the modulated features being an engraved three-dimensional topographical element of the surface, at least a part of the data (DA) being transcribed by a code-block structure of modulated features, the code-block structure thereby constituting a block structure corresponding to the at least one part of the data DA, whereby the modulated features of the first block structure BS are arranged according to a first ordered map, the first ordered map being a first finite ordered set of positions of the modulated features of a first code-block structure on the surface, the first block structure corresponding to a first part of the data, and whereby the first ordered map further is configured to arrange the modulated features of the first block structure BS to constitute an aesthetic ensemble on the surface and render the respective symbols corresponding to the modulated features of the first code-block structure imperceptible to the human eye, but retrievable by means of a software-driven image-sensor/processor combination.

Figure 32:
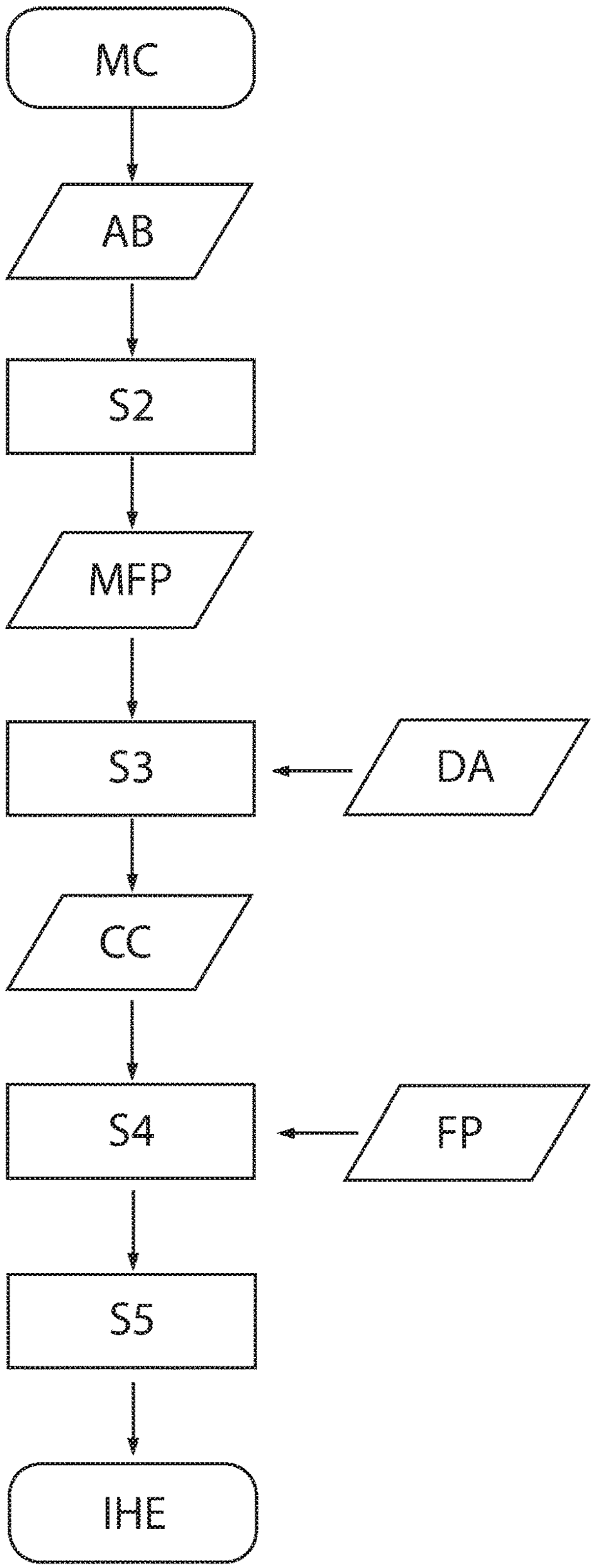
FIG. 32 contains a flowchart illustrating a method for configuring a plurality of block structures of modulated features and base features intended to be engraved on a surface of a solid piece according to an example embodiment of the invention.

FIG. 32 contains a flowchart 3200 illustrating a method for configuring MC a plurality of block structures of modulated features and base features intended to be engraved on a surface of a solid piece. As previously explained, each modulated feature and each base feature has respectively a three-dimensional modulated-feature profile and a three-dimensional base-feature profile, which enables to engrave each of the modulated features and each of the base features, each block structure comprises a corresponding code-block structure of transcribed data, and each block structure is a collection of modulated features and base features, configured to be spread over a spatially restricted part of the surface. The method comprises:

creating S2 each of the modulated features profiles MFP profiles by applying a corresponding modulation by means of a modulation of a modulation profile to one of the base features profiles, according to a symbol which transcribed a character of an alphabet AB, the alphabet being a set of characters, which are distinct objects of well-defined elementary data, transcribing S3 at least a first part of the data DA for a first code-block structure CC by means of the modulated-feature profiles, arranging S4 the modulated features corresponding to the first code-block structure CC in at least a first block structure of the plurality of block structures, according to a first ordered map FP, the first ordered map being a first finite ordered set of positions of the modulated features of the first code-block structure, and configuring S5 the modulated features in the first ordered map to constitute an aesthetic ensemble on the surface and render the respective symbols corresponding to the modulated features of the first code-block structure imperceptible to the human eye (IHE) for the intended engraving, but retrievable by means of a software-driven image-sensor/processor combination.

Figure 33:
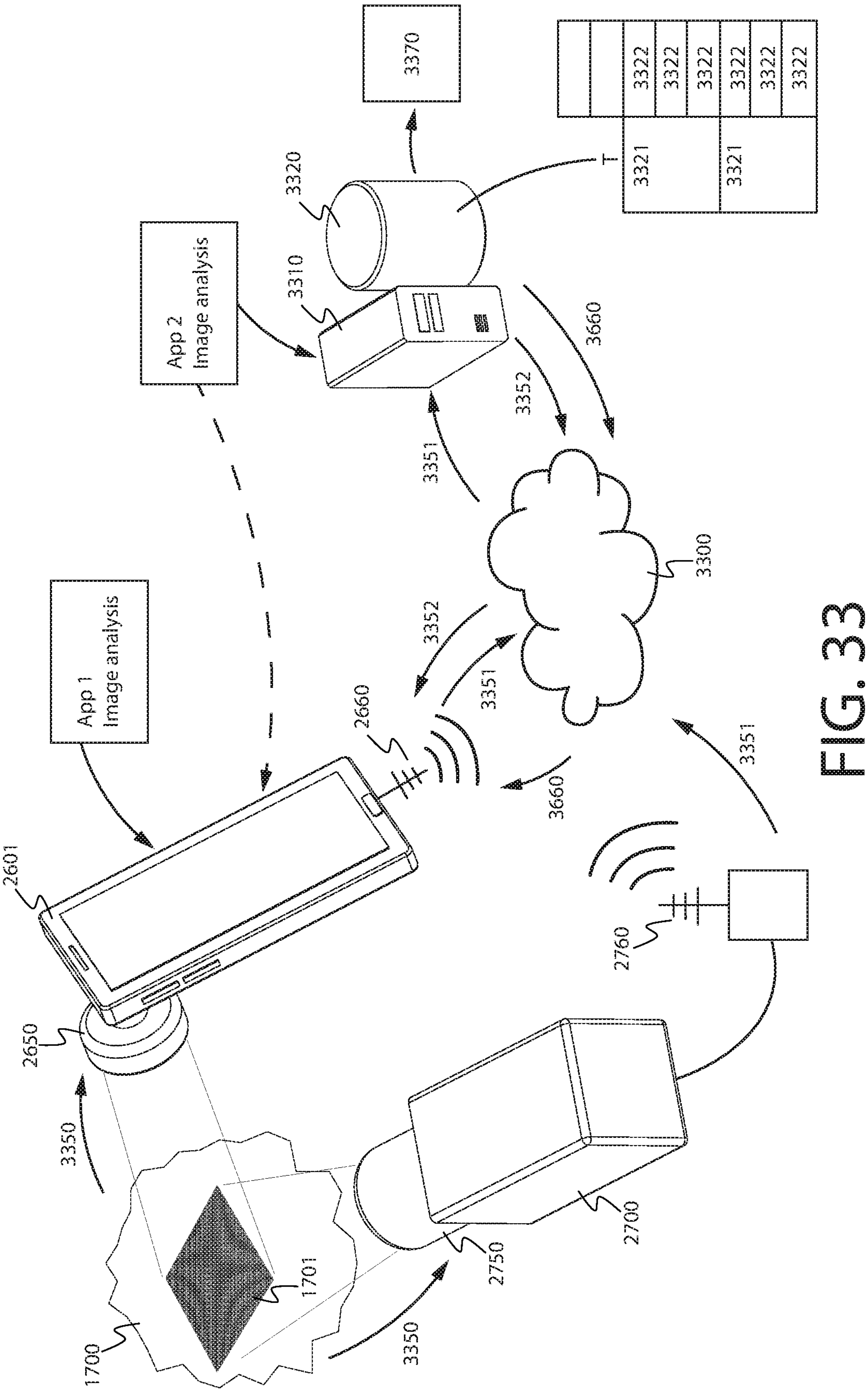
FIG. 33 illustrates an exemplary schematic and simplified representation of a system for reading, extracting, and matching an identifier or code for the purpose of, e.g., authentication.
Figure 34:
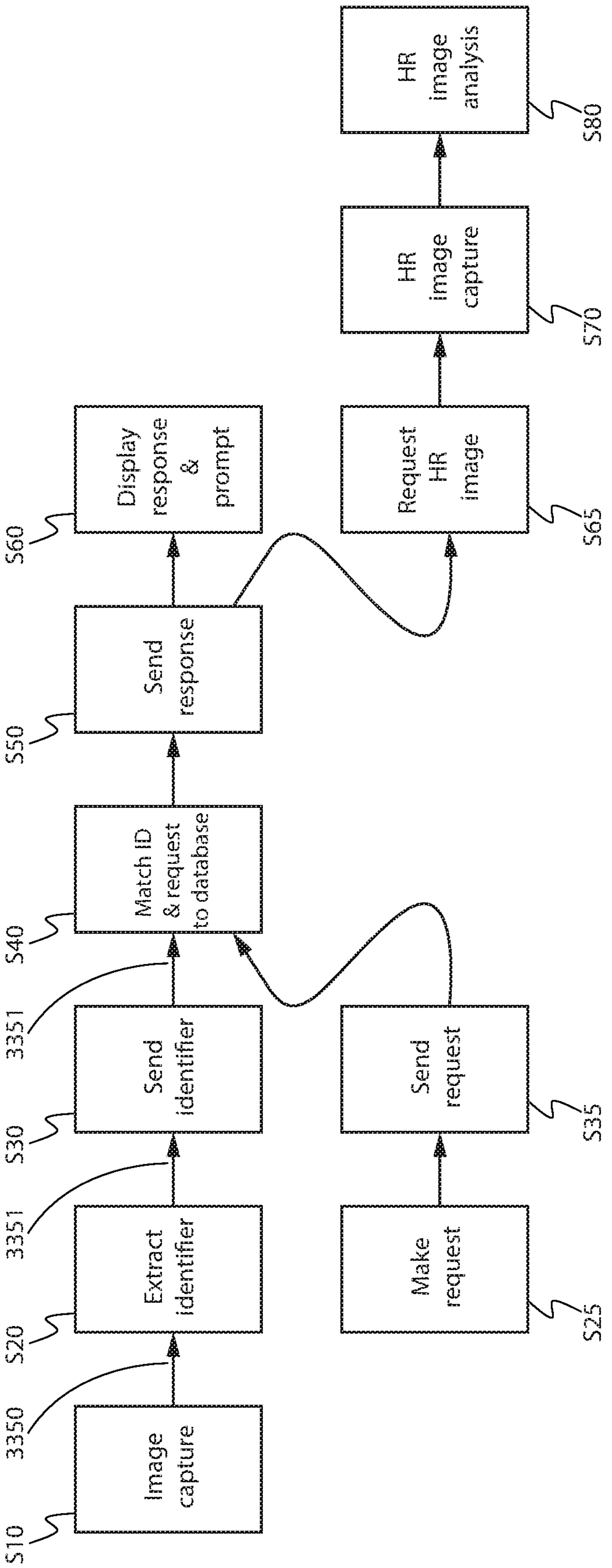
FIG. 34 shows a schematic representation of a corresponding method that can be performed on the system according to FIG. 34.

According to another aspect of the present invention, a system or a method is provided for capturing an image 3350 with a first data-processing device, for example a smartphone 2601, from a part of a surface, element or component 1700, part of a surface 1700 including a block structure 1701, analyzing the image 3350 to extract an identifier, code or other information 3351 therefrom, and matching identifier 3351 with information from a database, after sending identifier or code 3351 to another second data-processing device, for example server 3310. FIG. 33 shows an exemplary schematic and simplified representation of such a system for reading, extracting, and matching an identifier or code 3351 stemming from a part of a surface 1700, and FIG. 34 shows a schematic representation of a corresponding method that can be performed on the system. The exemplary system shown includes a smartphone or tablet computer 2601, a data communications network 3300, a server and database 3310 and 3320, respectively, and a camera 2700 for image capturing, preferably capable of providing a higher image quality than smartphone 2601. As explained above with respect to FIG. 17, part of a surface 1700 is hosting block structure 1701, which in turn is embedding a code-block structure having information coded therein with modulated features in addition to the base features.

More specifically, the system can include a smartphone 2601 or other data-processing device having a camera that is equipped with an image sensor and optics or another type of data-processing device that is operatively connected to a camera or image sensor, for example but not limited to personal computer (PC), tablet, Macintosh computer (MAC), handheld camera reader, smart camera, or other portable data-processing device, the smartphone 2601 configured to operate an image capture and analysis application APP1 for capturing and analyzing captures images 3350 from the camera associated with smartphone 2601 for reading codes or identifiers 3351 from the captured image 3350. For example, application APP1 can be installed and operated by user of smartphone 2601 having a graphical user interface (GUI) that in turn can use the camera application installed smartphone 2601, and can include different types of image-processing software and image-processing algorithms, for example decode algorithms, image filtering, and pattern-matching algorithms, software for geometric transformations, these algorithms allowing to identify code or identifier 3351 from image 3350. Moreover, smartphone 2601 includes a data communication interface 2660 and antenna, for example but not limited to a Bluetooth or Bluetooth LE interface, wireless local area network (WLAN) interface, global system for mobile communications (GSM) cellphone data interface, radio frequency (RF) communication, broadband cellular network interface such as but not limited to 3G, 4G, and 5G, optical data interface based for example on infrared signals, satellite-data based interface, data communication interface 2660 configured to communicate to and over a network 3300, for example the internet or an intranet. It is also possible that at least some of the connections to network 3330 is wired, for example by local area network (LAN) connections. Network 3300 is accessible by data communication interface 2660 of smartphone 2601, and is itself operably connected to a physical server, virtual server, cloud server or any other means of computation 3310 that has access to a database 3320. Database 3320 can be a physical database 3320 that can be located at server computer 3310. for example an external or internal hard drive, but can also be another remote server or a cloud-based database or network drive. Server 3310 is itself equipped with a data network interface to connect to network 3300, and having all necessary data interfaces and communication protocols for communication data from and to network 3300. Moreover, a memory space of database 3320 can store a table or data structure Twith information that is linked or otherwise in connection with identifier 3351, for example data structures and information that is associated with a specific identifier or code 3351. Not shown in FIG. 34 but easily understandable for a person skilled in the art, the data transmission to and from network 3300 will in most circumstances be accomplished in an encrypted manner in order to protect the information exchange between a smartphone/tablet 2601 or a camera device 2700 and the server/database combination 3310/3320.

For example, table or data structure T can include information 3322 that is linked to a query key 3321, also referred to as linked data 3322, and that is related to product or system that includes part of surface 1700, for example information 3322 that includes manufacturing information of part of a surface 1700 that is associated to code 3351, including but not limited to manufacturing date, manufacturing location, version information, technical data, data links to user manuals, construction plans, maintenance plans and schedules, compatibility information, information 3322 that includes data on foodstuff that are packaged to form part of a surface 1700 including but not limited to ingredients, country of origin information, location of origin information, expiration date of the food product, information on a product class, information 3322 that includes data on marketing and consumer information related to part of a surface 1700, for example but not limited to hyperlinks or data to promotions, flyers, white papers, websites, product warnings, product classifications, coupons, audiovisual representations such as YouTube™ videos, animations, user manuals, Microsoft PowerPoint™ presentations, portable document format (PDF) documents, information 3322 that includes intellectual property information related to part of a surface 1700, for example but not limited to data on patents, designs, trademarks, copyrights, open source software information, geographic indicators, information 3322 that includes data with pharmaceutical information, for example but not limited to pharmaceutical manuals, quality and dose information, dispensing information, warning information, information 3322 can also include further identification information related to part of surface 1700, for example but not limited to owner information, serial numbers, address information, product, hardware or software version information, manufacturing history information, logistics tracking information.

Moreover, computing device 3310 can have an application software APP2 installed and operated thereon, application software APP2 managing the database 3320 and the table or data structure T, and configured to receive, process, and respond to request made by application software APP1. For example, application software APP2 can receive specific queries and requests from application software APP1 from smartphone 2601, and can process and respond to these, by sending a response 3352 back to smartphone 2601 via network 3300, for example by including data extracted from table or data structure T that is linked to the received identifier or code 3351. Application software APP2 can also be equipped with additional image processing software that allows receiving image data from smartphone 2601, for example raw, pre-processed or compressed image data. In this respect, smartphone 2601 and APP1 can send to server 3310 and application software APP2 image data that has been captured by smartphone 2601 of block structure 1701 of part of a surface 1700. For example, this can be done upon sending a request 3660 from APP2 to APP1 of the smartphone 2601. This allows application software APP2 performing additional processing on the image data, for example one that is more complex that the one performed at application software APP1. In a variant, it is also possible that APP1 of smartphone 2601 directly accesses a gateway or an application programming interface (API) to access data of table or data structure T. and that no additional application software is present at server 3310 but only an application-specific interface, but that server 3310 acts as a data provider to smartphone 2601, with APP1 accessing server 3310 for requesting data from table or data structure T. In this respect, it is possible that APP1 and APP2 are operated as one application on smartphone 2601. Moreover, data communication with the sending of information on identifier or code 3351 and the responses 3352 with additional data sent from table or data structure T can be secured by different encryption and authentication schemes that are known in the field of safe message exchanges. Moreover, software application APP2 can further include data interfaces to other external applications 3370, for example via an API, to access additional information from third parties that can relate or is otherwise linked to identifier or code 3351. For example, a track and trace application 3370 can be accessed, that can provide for logistics and manufacturing information from a third party, that can be thereafter sent back to smartphone 2601 on the GUI of the software application APP1.

The system can further include a camera 2700 for image capturing, preferably capable of providing a higher image quality than smartphone 2601 that can also be operatively connected to network 3300, for example via a network interface device 2760. Camera 2700 can be a machine vision inspection camera with appropriate optics and illumination for capturing sufficient detail of block structure 1701 of part of a surface 1700, and connected to a frame grabber or other fast data-transfer interface such as but not limited to FireWire, Universal Serial Bus (USB), Ethernet, or a wireless interface, to a computing device having a data-communication interface, for example a network interface 2760 for network 3300. Network interface device 2760 could itself be a computer such as a PC or a Macintosh computer that is operatively connected to network 3300 and to camera 2700. As an example, camera 2700 can be equipped with an application-specific optics or lenses 2750 for capturing an image 3350 of block structure 1701 of part of surface 1700, for example a macro lens, microscope lens, or other lens. Preferably, camera 2700 and optics 2750 are such that they that allow capturing an image of substantially better and more adapted image quality than camera of smartphone 2601 alone. In addition or alternatively to camera 2700, it is possible that smartphone 2601 is equipped with an additional optics 2650 that allows improving and/or adapting the image capture of block structure 1701 of part of a surface 1700, for example a specific macro lens that can be clipped, slid on, or otherwise operatively attached to smartphone 2601. Furthermore, such optics 2650 may also be used to de-warp or flatten the acquired image according to specific surface forms such as cylinders or other, well defined geometries of objects.

With respect to a specific example and application, it would be possible to mark a pharmaceutical or drug product with the non-perceptible codes or identifiers 3351 within block structure 1701, and these codes or identifiers could be used by a user or patient to see if the pharmaceutical product received matches with his electronic prescription and/or his user profile. For example, it would be possible that code or identifier 3351 is provided with block structure 1701 that is part of a blister packaging 2900 of, e.g., pharmaceutical, reduced-risk smoking, or any other blister-packed products 2902, it would be possible to link identifier 3351 to an electronic prescription or e-prescription, e-Rx for the pharmaceutical product that has been prescribed to a user. In addition, server 3310 could have access or pre-stores a profile of the user, for example via a secured access to an external application 3370, including but not limited to gender, date of birth, age, weight, pre-existing health conditions, size, body-mass-index, medication history, allergies. For example, a blister packaging for a pharmaceutical product could be sealed and covered by a lidding material that is made of metalized film or metallic film, or a laminate, as shown in FIG. 29. This lidding material could have marketing information printed thereon, but at the same time the lidding material could be embossed by a decorative pattern having one or more identifiers or codes 3351 embedded therein. As an example, each blister 2900 for each individual pill, dose or liquid-filled pod 2902 of blister packaging 2900 could have a separate and distinct code embossed in the cover formed by the lidding material that would appear as a separate block structure 1701 on top of each blister 2902.

For example, a part of a surface 1700 is shown having a surface with block structure 1701 provided thereon, for example a structured surface or an embossed material, having the base features and the modulated features. For example, part of a surface 1700 could be a component for a jewelry or watch product having an etched, engraved or embossed surface for block structure 1701, an embossed packaging material, for example a lining or other packaging foil for tobacco products, packing material for food products such as chocolate or other foodstuff and perishable goods, a capsule or cartridge for an e-cigarette, a packing material for a parcel that is used for local or global shipment with a hidden code provided by block structure 1701. But part of a surface 1700 is not limited to these examples. As an example, block structure 1701 can be checkerboard pattern, for instance an n×n matrix (not shown) having the checkerboard map of base features, in other words alternating embossed bumps and sinks as the base features, but also having some of the individual checkerboard elements offset from a center position as the modulated features, for example with an xy-offset from a center position of each square-shaped element of the grid formed by the matrix to the left upper corner, left lower corner, right upper corner, and right lower corner, thereby allowing to encode information. For example the offsets are in the micrometer or sub-millimeter range, e.g., a range between 5 μm to 250 μm, and are therefore not visible to a human eye without additional optical aid, but the checkerboard pattern can be part of an aesthetic or decorative embossing, and therefore visible by a human eye as a shading or a surface texture, for example a surface structuration or part of a logo.

FIG. 34 shows an exemplary and simplified flowchart of a method that can be performed by the system. The method allows reading and extracting one or more identifiers 3351 from block structure 1701 of part of a surface 1700, by capturing image information, and thereafter to find and to process information and data that is linked to the one or more identifiers 3351 with a database, table, or data structure T. The method can first include a step S10 of capturing image data 3350 of an image of block structure 1701 of part of a surface 1700, for example by using APP1 of smartphone 2601, and this can be done by the user operating an icon or button of the GUI of APP1. Next, in a step S20, the APP1 of smartphone 2601 can process the received image data 3350 to extract an identifier or code 3351. Thereafter, identifier or code 3351 can be sent with a step S30 to server 3310 and application software APP2, via network 3300, or with a direct communication link between smartphone 2601 and server 3310. This can be done by a standard messaging protocol or a specific data packet transmittal with a customized protocol, and this step can also include an encryption scheme for the safe transmission. Next, upon reception of identifier 3351 with a message or data packet at server 3310, and the optional decryption of the date of the message or data packet, server 3310 can perform a step S40, where a database having a table or data structure T is queried for data that is linked to identifier or code 3351, to access linked data 3322. Next, server 3310 can perform a step S50 that sends a response back to smartphone 2601, for example a message or a data packet including the linked data 3322. This step again can include an encryption step that is performed on the data before being sent. In a next step S60, at smartphone 2601, the message or data packet can be received, optionally decrypted, and the linked data can be displayed to the GUI of APP1 of smartphone 2601. In this step, GUI of APP1 can also create a user prompt in the form of a notification message or notification screen to get the attention of the user or operator of smartphone 2601.

Next, at the server 3310, application software APP2 can be further configured to perform a step S65 upon receiving identifier or code 3351, and after querying the database or table T. This step S65 can be triggered if information from the database or table T indicates that the product or part of a surface 1700 with block structure 1701 is prone to unauthorized copying or counterfeiting. This could be the case if part of a surface 1700 is a cigarette package that is counterfeited often for gray or black markets. For example, a data entry of table T could be linked to identifier or code 3351, to indicate that the part of a surface 1700 under inspection or investigation is likely to be a counterfeited or copied product. This data entry could be examined by APP2 to trigger step S65 that sends a request back to smartphone 2601 and APP1 to capture another image from block structure 1701, but with a higher image quality, with the goal to perform a deep or forensic examination of block structure 1701. For example, this request could include, but is not limited to, the instruction for capturing a higher-resolution (HR) image, request the capturing of an image with a higher contrast or high dynamic range (HDR), the request to change the illumination to a different or stronger illumination.

Upon receiving the request at the smartphone 2601 with APP1, the GUI could prompt or otherwise inform the user of this request, for example with a GUI window informing the user with instructions to capture an image of better quality. Step S70 can then be performed where image date of an image of increased quality is captured by user, for example by the use of a separate camera 2700, or by the use of additional optics 2650 that are clipped onto smart phone 2601. Thereafter, improved image data can be sent back to server 3310 for further analysis by APP2, for example with a step S60, for deep or forensic authentication of the image data of block structure 1701. The involved image-processing algorithms of S80 may include highly complex and advanced methods, which are not real-time applications anymore due to their level of complexity. Therefore, in intermediate steps, responses 3352 may include message to the user to be patient and wait for the result.

Another step of the method is step S25, where a request for database querying and a step of sending the request to server 3310 is done by APP1 of smartphone 2601, for example via the graphical user interface by the user or automatically by the preset mode of the application, e.g., depending on the user function and depending on access rights. In this respect, the capturing of the image data 3350 with step S10 and the sending of the identifier is done separately and only upon making a request by steps S25 and S35, server 3310 will return database information, with linked data 3322 back to smartphone 2601.

Figure 35:
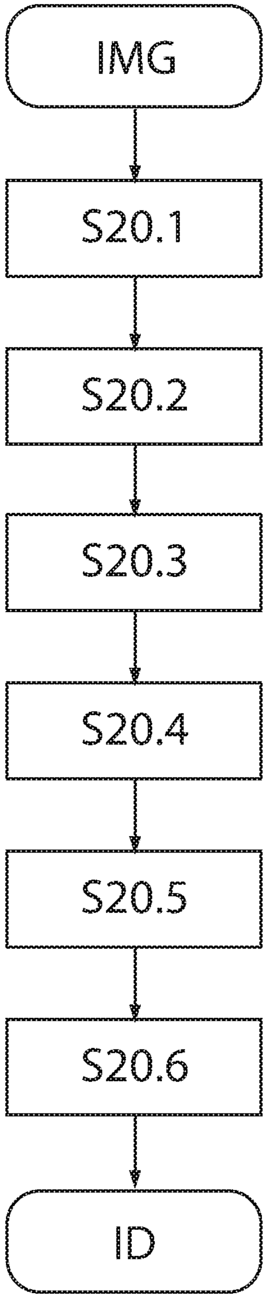
FIG. 35 shows an exemplary flowchart of steps that may be performed as an application of a smartphone can process received image data to extract an identifier or code.

FIG. 35 shows an exemplary flowchart of the steps that can be performed as substeps of step S20, in which APP1 of smartphone 2601 can process the received image data 3350 to extract an identifier or code 3351. Within this step, with a step S20.1, the image 3350 is subjected to pre-processing to provide for an image of better quality and format for feature detection or pattern matching purposes, to obtain a filtered or calibrated image. For example, this step S20.1 can include but is not limited to a step of removing artifacts by different types of filters, a noise-removal step, for example by median or averaging filters, fixed-pattern noise removal, a contrast-enhancing step for example by a moving-histogram equalization (MHE) algorithm, an illumination-adaption step to increase or decrease pixel intensity, an illumination non-uniformity correction step with linear or non-linear corrections, a geometric distortion correction step, motion smear compensation algorithms, digital zoom-in or zoom-out normalization processing.

Next, the filtered or calibrated image can be subjected to a grid extraction or segmentation algorithm with step S20.2. In this step, the filtered or calibrated image is subject to a data-processing step that can overlay a grid over the filtered image, which will serve as a reference coordinate system for further data processing on the image. Furthermore, the extracted grid will provide the basis for determining the feature positions on a map, which will be used in later steps S20.3, S20.4, etc. Typical grid-extraction algorithms contain Fast Fourier Transforms (FFTs) on the global scale as well as adaptive search and correlation algorithms on the local scale. The map provided in this step can be based on different types of coordinate basis.

Thereafter, the segmented image that results from step S20.2 can be subject to a (code-block) synchronization step in a step S20.3, in which the code-block synchronization pattern, marker, target, object point is identified, detected and located, so that a reference for detecting the code or identifier 3351 in the code-block structure is possible. This can be done by pattern matching or feature-detection algorithms of different kinds, for example by correlation techniques, machine learning, optical character-recognition (OCR) techniques, supervised or non-supervised training.

Next, a step S20.4 is performed where the different symbols that represent the modulated features of block structures 1701 are detected and extracted, in reference to a position or location of the code-block synchronization pattern. This can be done by matching edges, corners, interest points, blobs, region of interests with a reference-image data set of modulated features of block structures 1701. It is also possible that this step include a step of feature extraction. Moreover, it is also possible that this step S20.4 includes the use of artificial intelligence, for example, a convolutional neural network and deep learning of model data sets for detecting the features, being the modulated features of block structures 1701. This can be done by having a dataset of labelled images with all the different modulated features of the block structures 1701. It is to be noted that the output of this feature-detection step is soft information, i.e., non-binary information or probability information, in most of the cases, in order to benefit from additional coding gain in the subsequent decoding step S20.6.

Thereafter a step S20.5 is performed, where the descrambling of the information contained in the code-block structure is done according to the arrangement of the modulated features in the ordered map. This step will bring the extracted (soft-) symbol information into the linear order required by the subsequent decoding step S20.6.

Thereafter, a step S20.6 is performed where the identifier or code 3351 is decoded from the different detected (soft-) symbols. Since redundant information was added during the encoding step, the decoding is done using standard algorithms for forward error-correcting (FEC) codes and will use the linearly arranged soft-symbol information as its input together with the knowledge of the exact structure of the code. Typical FEC codes that are known for high-performance error-correction properties include, but are not limited to, Turbo codes or Polar codes, etc. In particular, Polar codes are well suited for the task at hand as they are easily constructed and benefit from suitable hardware implementations as is seen in the latest 5G data-communication standards.

According to yet another aspect, it is possible that the captured image is linked or otherwise associated with a unique and secret code or identifier, for example by using the subscriber identification module (SIM) of the smartphone 2601 for generating a code, or by using an cryptographic algorithm that can extract a code or otherwise protected information from the captured image 3350, so that the image can be authenticated at a later stage as being the originally captured image. This unique code or identifier can be sent from APP1 to APP2 with step S30 together with identifier 3350, and thereby APP2 will have authentication information for the captured image 3350, without initially having access to the captured image data 3350 itself at APP2. For example, to generate the secret code, a hash or checksum code could be generated from image data, and also be based on a time of capture and location data of capture as is usually found in the EXIF data of the image, together with another unique code that can be generated by the SIM card or any other type of token able to produce such a unique, secure information element. Once image data 3350 is sent to APP2 of the second data-processing device, it would make it possible to authenticate the received image of step S65, S70, so that the later received image for deep or forensic authentication could also be authenticated as being the image 3350 at APP2 from which the original code has been extracted. This allows the APP2 to verify whether the received image data 3350 is actually from the same image that was captured initially by step S10.

The invention claimed is:

1. An engraved solid piece carrying data comprising specific information on a surface of the engraved solid piece,
the surface being covered by a plurality of block structures, comprising at least a first block structure,
each block structure being a spatially restricted collection of modulated features and base features, which are spread over the surface of the engraved solid piece,
each modulated feature and each base feature having respectively a three-dimensional modulated-feature profile and a three-dimensional base-feature profile,
each of the modulated-feature profiles being the result of applying a corresponding modulation to one of the three-dimensional base-feature profiles, according to a specific corresponding information,
each modulated feature further being a symbol, which is a transcription of a character of an alphabet,
the alphabet being a collection of characters, which are distinct objects of well-defined elementary data,
each of the base features being an engraved elementary three-dimensional topographical element of the surface,
each of the modulated features being an engraved three-dimensional topographical element of the surface,
at least a part of the data being transcribed by a code-block structure of modulated features, the code-block structure thereby constituting at least a part of a block structure corresponding to the at least one part of the data,
the modulated features of the first block structure being arranged according to a first ordered map, the first ordered map comprising at least a first finite ordered set of first positions of the modulated features of a first code-block structure on the surface, the first block structure corresponding to a first part of the data, and
the first ordered map further being configured to arrange the modulated features of the first block structure to constitute an aesthetic ensemble on the surface and render the respective symbols corresponding to the modulated features of the first code-block structure imperceptible to the human eye, but retrievable by means of a software-driven image-sensor/processor combination, wherein for each of the modulated features, a two-dimensional integral over an entire feature of an angle difference between a normal of the modulated feature and that of a base feature is below a threshold in human vision capability.

2. The engraved solid piece of claim 1, further comprising on its surface
an at least one second block structure being a second spatially restricted collection of exclusively a plurality of at least one of the base features, and
the base features of the at least one second block structure being arranged on the solid surface according to a second map, the second map being a second finite set of positions of the base features on the surface,
the second map further enabling its base features to be arranged to constitute an aesthetic ensemble on the surface.

3. The engraved solid piece of claim 2,
further comprising a plurality of first ordered maps and second maps,
wherein the plurality of first ordered maps and second maps are arranged along at least a regular grid.

4. The engraved solid piece of claim 2,
further comprising a plurality of first ordered maps and second maps,
wherein the plurality of first ordered maps and second maps are arranged along at least a randomized grid.

5. The engraved solid piece of claim 2,
further comprising a plurality of first ordered maps and second maps, wherein the plurality of first ordered maps and second maps are
configured to carry first parts of data and constitute at least one aesthetic ensemble; and
arranged such that the positions of the modulated features of the carried first parts of data is imperceptible to the human eye, but retrievable only by means of a software-driven image-sensor/processor combination.

6. The engraved solid piece of claim 1, wherein the engraved solid piece:
has a cylindrical symmetry, and
is configured as a tool for a transfer of the modulated features and/or the base features into a substrate,
the transfer being any one of the following:
shaping, printing, molding, crafting, pressing, and embossing onto or into the substrate, of the modulated features and/or the base features.

7. The engraved solid piece of claim 1, wherein the engraved solid piece is
configured to be used as a forming tool, for a transfer of the modulated features and/or the base features into a substrate,
the transfer being any one of the following:
printing, molding, crafting, pressing, and embossing onto the substrate, of the engraved modulated features and/or the engraved base features.

8. The engraved solid piece of claim 1, further comprising
at least a further first ordered map, the further first ordered map being a further finite set of further positions of the modulated features on the surface, each further position being a result of a determined translation of a corresponding first position of the first ordered map, the further first ordered map being configured to define a further first block structure that is non-overlapping with the first block structure defined by the first ordered map, and either adjacent to the first block structure;

separated from the first block structure by a determined distance; or in case there are a plurality of further first ordered maps, separated from each other in a regular manner in 2 dimensions.

9. The engraved solid piece of claim 1, further carrying a third part of data on the surface corresponding to a third map, the third map being a third finite set of positions of the modulated features on the surface, the third map being configured to define a third block structure that is non-overlapping with the first block structure defined by the first map, and any one of the following adjacent to the first block structure;

separated from the first block structure by a determined distance; or in case there are a plurality of third maps, separated from each other and from the first block structure.

10. A method for manufacturing (MM) an engraved solid piece (SP) configured for carrying data (DA) comprising specific information, on a surface of the engraved solid piece, the method comprising engraving (S1) on the surface a plurality of block structures (BS), comprising at least a first block structure, whereby each block structure is a spatially restricted collection of modulated features and base features, which are spread over the surface of the engraved solid piece, each modulated feature and each base feature having respectively a three-dimensional modulated-feature profile and a three-dimensional base-feature profile, each of the modulated-feature profiles being the result of applying a corresponding modulation to one of the three-dimensional base-feature profiles, according to a specific corresponding information, each modulated feature further being a symbol, which is a transcription of a character of an alphabet, the alphabet being a set of characters, which are distinct objects of a well-defined elementary data, each of the base features being an engraved elementary three-dimensional topographical element of the surface, each of the modulated features being an engraved three-dimensional topographical element of the surface, at least a part of the data (DA) being transcribed by a code-block structure of modulated features, the code-block structure thereby constituting at least a part of a block structure corresponding to the at least one part of the data (DA), whereby the modulated features of the first block structure (BS) are arranged according to a first ordered map, the first ordered map comprising at least a first finite ordered set of first positions of the modulated features of a first code-block structure on the surface, the first block structure corresponding to a first part of the data, and whereby the first ordered map further is configured to arrange the modulated features of the first block structure (BS) to constitute an aesthetic ensemble on the surface and render the respective symbols corresponding to the modulated features of the first code-block structure imperceptible to the human eye, but retrievable by means of a software-driven image-sensor/processor combination, wherein for each of the modulated features, a two-dimensional integral over an entire feature of an angle difference between a normal of the modulated feature and that of a base feature is below a threshold in human vision capability.

11. The method for manufacturing of claim 10, wherein the step of engraving (S1) on the surface a plurality of block structures is executed by any one of the following:

(precision) milling, laser ablation, chemical engraving, plasma etching, and stamping.

12. A method for configuring (MC) a plurality of block structures of modulated features and base features intended to be engraved on a surface of a solid piece, whereby each modulated feature and each base feature has respectively a three-dimensional modulated-feature profile and a three-dimensional base-feature profile, which enables to engrave each of the modulated features and each of the base features, each block structure comprises a corresponding code-block structure of transcribed data, and each block structure is a collection of modulated features and base features, configured to be spread over a spatially restricted part of the surface, the method comprising:

creating (S2) each of the modulated features profiles (MFP) by applying a corresponding modulation by means of a modulator feature profile to one of the base features profiles, according to a symbol, which is a transcription of a character of an alphabet (AB), the alphabet being a collection of characters, which are distinct objects of well-defined elementary data, transcribing (S3) at least a first part of the data (DA) for a first code-block structure (CC) by means of the modulated-feature profiles, arranging (S4) the modulated features corresponding to the first code-block structure (CC) in at least a first block structure of the plurality of block structures, according to a first ordered map (FP), the first ordered map being a first finite set of positions of the modulated features of the first code-block structure, and configuring (S5) the modulated features in the first ordered map to constitute an aesthetic ensemble on the surface and render the respective symbols corresponding to the modulated features of the first code-block structure imperceptible to the human eye (IHE) for the intended engraving, but retrievable only by means of a software-driven image-sensor/processor combination, wherein for each of the modulated features, a two-dimensional integral over an entire feature of an angle difference between a normal of the modulated feature and that of a base feature is below a threshold in human vision capability.

* * * * *